US006704502B2

(12) United States Patent
Morofuji

(10) Patent No.: US 6,704,502 B2
(45) Date of Patent: Mar. 9, 2004

(54) VIBRATION CORRECTION APPARATUS AND OPTICAL DEVICE

(75) Inventor: Tsuyoshi Morofuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 10/024,421

(22) Filed: Dec. 18, 2001

(65) Prior Publication Data

US 2002/0051635 A1 May 2, 2002

Related U.S. Application Data

(62) Division of application No. 08/607,769, filed on Feb. 27, 1996, now Pat. No. 6,343,188.

(30) Foreign Application Priority Data

Mar. 2, 1995 (JP) .............................. 7-043006
Mar. 2, 1995 (JP) .............................. 7-043012

(51) Int. Cl.[7] ............................................ G03B 17/00
(52) U.S. Cl. ........................................................ 396/55
(58) Field of Search ............................. 396/52, 53, 54, 396/55; 359/554

(56) References Cited

U.S. PATENT DOCUMENTS

| 4,713,697 A | 12/1987 | Gotou et al. ............... 358/222 |
| 4,999,665 A | 3/1991 | Kuroda et al. ............. 396/279 |
| 5,166,723 A | 11/1992 | Yoshida et al. ............. 396/52 |
| 5,170,255 A | 12/1992 | Yamada et al. ............. 348/208 |
| 5,237,365 A | 8/1993 | Miyazawa .................... 396/49 |
| 5,331,365 A | 7/1994 | Miyazawa et al. ........... 396/51 |
| 5,386,264 A | 1/1995 | Sekine et al. ................. 396/55 |
| 5,463,443 A | 10/1995 | Tanaka et al. ................ 396/55 |
| 5,655,158 A | 8/1997 | Kai ............................... 396/55 |
| 6,064,138 A * | 5/2000 | Iino et al. ............. 310/316.01 |
| 6,070,015 A | 5/2000 | Shiomi ......................... 396/55 |
| 6,343,188 B1 * | 1/2002 | Morofuji ...................... 396/55 |

FOREIGN PATENT DOCUMENTS

JP          11-84457          3/1999

* cited by examiner

Primary Examiner—Christopher Mahoney
(74) Attorney, Agent, or Firm—Morgan & Finnegan, L.L.P.

(57) ABSTRACT

It is an object of the present invention to obtain optimum driving characteristics by correcting a deterioration in vibration correction characteristics, which is caused by a mechanical degradation such as shaft friction or deformation caused by the temperature and time change of vibration correction unit, or variations caused by the difference between individual devices. In order to achieve this object, a vibration correction apparatus for correcting the movement of an image which is caused by a vibration includes a calibration function by which an angular velocity detected by an angular velocity detection unit is integrated and converted into an angular displacement signal to generate a vibration signal, a variable angle prism (VAP) is driven on the basis of the vibration signal, the offsets of the frequency characteristic, the driving limit, and the initial position are detected from the response characteristics obtained when a predetermined test driving signal is supplied to the VAP, and the offsets are corrected.

31 Claims, 17 Drawing Sheets

FIG. 10
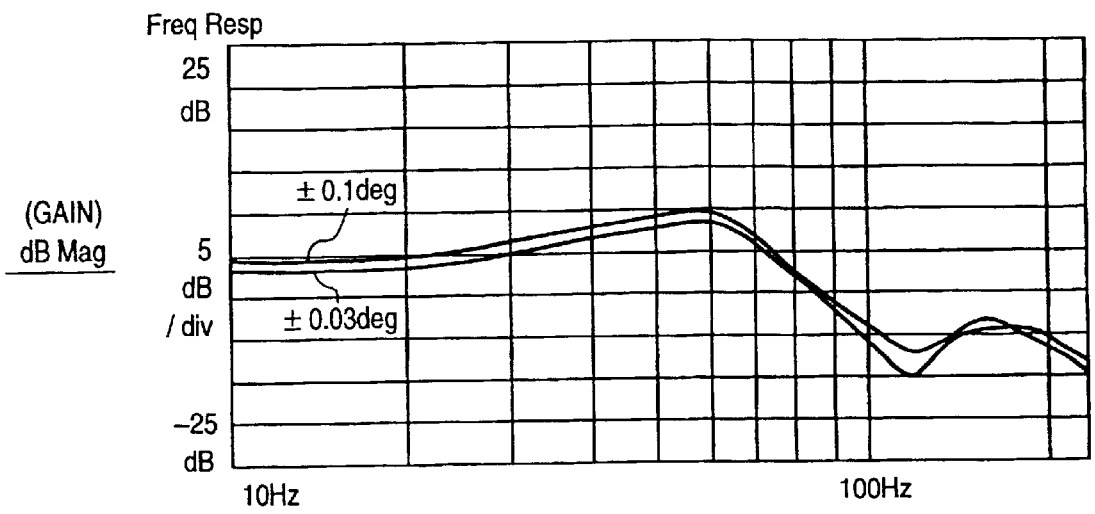
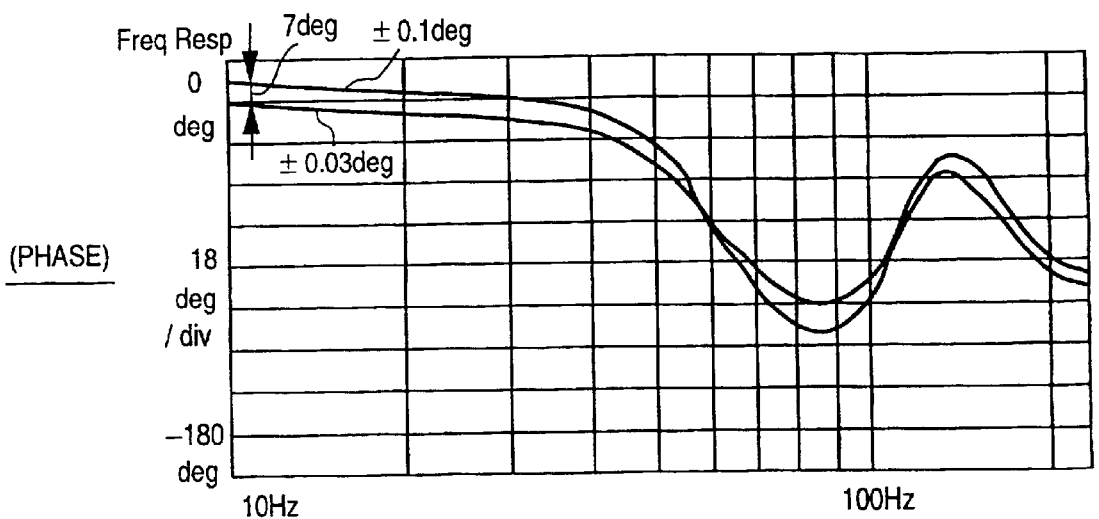

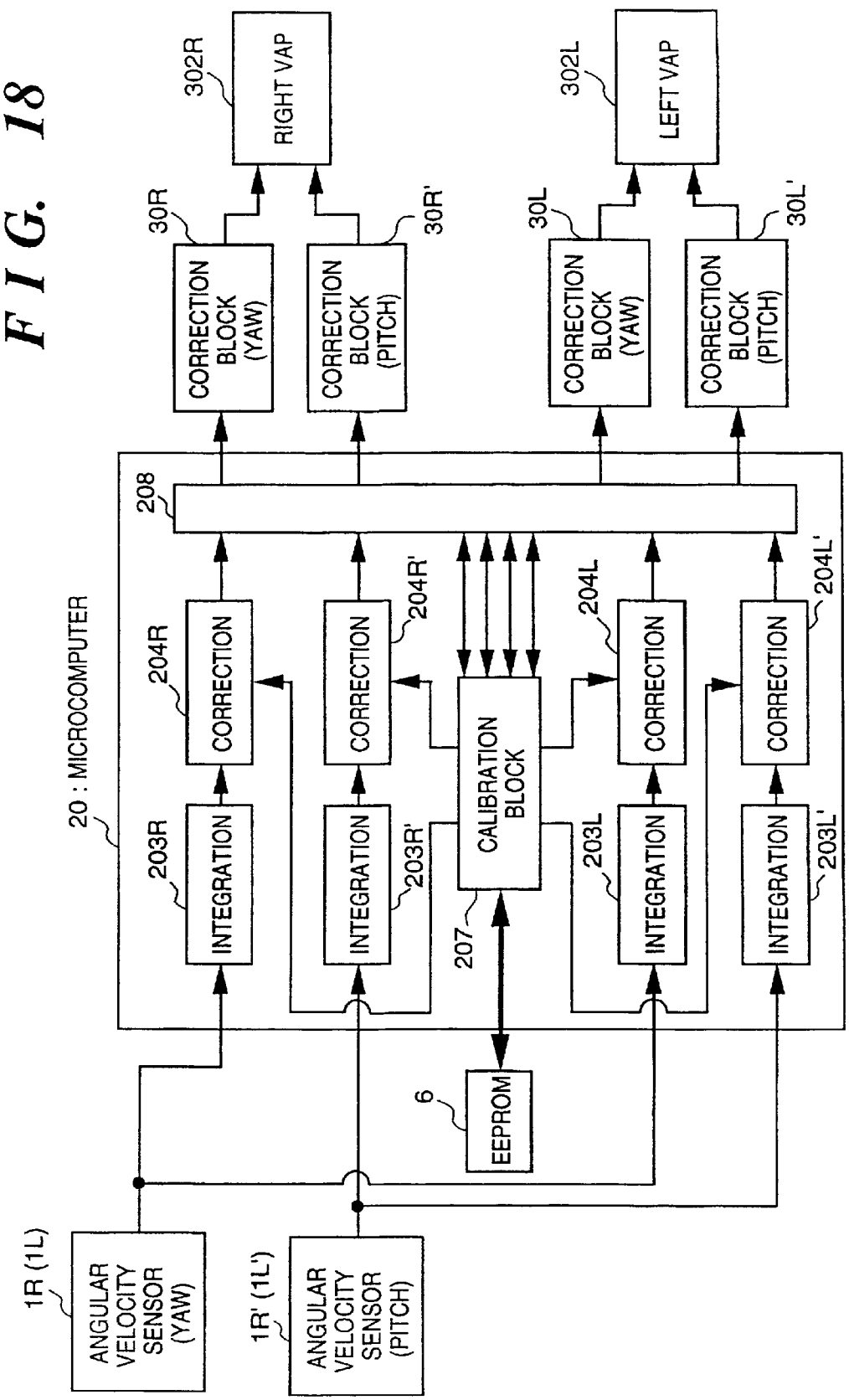

VIBRATION CORRECTION APPARATUS AND OPTICAL DEVICE

This application is a division of Ser. No. 08/607,769 filed Feb. 27, 1996 now U.S. Pat. No. 6,343,188.

BACKGROUND OF THE INVENTION

The present invention relates to an image blur correction apparatus suitable for a image sensing device such as a silver halide camera and a video camera or an optical device such as a binocular.

In the field of photographing devices such as a silver halide camera and a video camera, conventionally, automatic and multi-functional arrangements for exposure setting, focus adjustment, and the like are in progress. This makes it possible to always perform a satisfactory photographing operation regardless of the photographing environment.

However, the image quality largely deteriorates due to a camera shake in fact. In recent years, therefore, various vibration correction apparatuses for correcting this camera shake are proposed and receiving a great deal of attention.

As for vibration correction apparatuses, their correction systems are roughly classified into optical correction and electrical correction using image processing, and detection systems are classified into physical vibration detection and detection by image processing using an image vector. Various combinations of these systems are proposed.

Optical vibration correction will be described below. An angular velocity detection means such as a vibration gyroscope is provided as a vibration detection means. A velocity signal output from the angular velocity sensor is integrated and converted into an angular displacement signal. An optical vibration correction means such as a variable angle prism (to be referred to as a VAP hereinafter) capable of changing the direction of optical axis is driven, thereby optically correcting the vibration.

Such an optical vibration correction apparatus has a feedback loop in which the VAP is driven in accordance with a vibration correction control signal for performing normal vibration correction, and simultaneously, the angular displacement of the VAP is detected to drive the VAP to a position corresponding to the control signal.

In the vibration correction apparatus using the optical/mechanical vibration correction means such as the above-mentioned VAP, however, a mechanical degradation such as shaft friction and element deformation is caused particularly by the temperature and time change of a mechanical movable portion. This may cause a deterioration in responsiveness (follow-up properties), which is not negligible in control of a relatively small vibration (e.g., when the optical axis is slightly (about 0.03 deg in an embodiment to be described later) displaced for polarization). In addition, variations in VAPs and their driving systems are large.

In the vibration correction apparatus using the VAP controlled by a servo mechanism, such a deterioration or variation in mechanical performance results in a disadvantage so that the central position for control shifts due to load variations such as a temperature and time change.

Additionally, the driving limit of the VAP disadvantageously varies because the elements change due to a temperature and time change, or the battery is consumed.

Furthermore, since variations in optical axis adjustment are large, the generated vibration cannot be completely absorbed by vibration correction only by adjustment using the offset of an output signal from a low-end one-chip microcomputer in some cases.

SUMMARY OF THE INVENTION

Accordingly, it is an object of the present invention to provide a vibration correction apparatus which corrects a mechanical degradation such as shaft friction or element deformation, or a delay in response due to the temperature and time change of a movement correction means and simultaneously corrects variations due to a difference between individual driving systems, thereby always ensuring satisfactory response characteristics.

According to the present invention, the foregoing object is attained by providing a vibration correction apparatus comprising vibration detection means for detecting a vibration, movement correction means for correcting a movement of an image, which is caused by the vibration, on the basis of an output from the vibration detection means, and control means for detecting response characteristics of the movement correction means with respect to a predetermined driving signal and correcting driving characteristics of the movement correction means on the basis of a detection result.

In accordance with the present invention as described above, when the response characteristics of the movement correction means with respect to a test driving signal are detected, the offset is corrected so that a change in characteristics caused by a mechanical error such as shaft friction or element deformation caused by the temperature and time change can be corrected.

There is also provided a vibration correction apparatus comprising vibration detection means for detecting a vibration of an image sensing device main body, movement correction means for correcting a movement of an image, which is caused by the vibration, on the basis of an output from the vibration detection means, characteristic detection means for detecting response characteristics of the movement correction means with respect to a predetermined driving signal and calculating an offset between a detection result and a predetermined reference value, storage means for storing the offset calculated by the characteristic detection means and control means for correcting driving characteristics of the movement correction means on the basis of offset information stored in the storage means.

With the above arrangement, when the response characteristics of the movement correction means with respect to the test driving signal are detected, the offset to ideal response characteristics is detected, and the transfer characteristics are corrected. Since this offset information is stored and used for the subsequent control, the operation of the movement correction means is always performed with the optimum characteristics, and a change in characteristics due to a mechanical error such as shaft friction or element deformation caused by the temperature and time change is compensated.

Accordingly, it is another object of the present invention to provide a vibration correction apparatus and an optical device which simultaneously performs balance adjustment of the response characteristics between a plurality of optical systems of an optical apparatus such as a binocular to which the vibration correction apparatus is applied, thereby obtaining vibration correction characteristics while equalizing the characteristics of the optical systems.

According to the present invention, the foregoing object is attained by providing a vibration correction apparatus comprising first movement correction means for correcting a movement of an image which is caused by a vibration, second movement correction means for correcting the movement of said image, which is caused by the vibration and control means for detecting response characteristics of said first movement correction means with respect to a predetermined driving signal and response characteristics of said second movement correction means with respect to the driving signal, and correcting the driving characteristics of one of said first and second movement correction means such that the response characteristics of said first movement correction means are substantially equalized with those of said second movement correction means.

In accordance with the present invention as described above, the response characteristics of the first and second movement correction means can always be equally set, and balance adjustment between the response characteristics of the movement correction means can be performed. At the same time, a change in characteristics due to a mechanical error such as shaft friction or element deformation caused by the temperature and time change is corrected.

There is also provided an optical device comprising a first optical system having a movable portion for changing optical characteristics, first driving means for driving the first optical system, a second optical system having a movable portion for changing the optical characteristics, second driving means for driving the second optical system and control means for detecting response characteristics of the first and second optical systems with respect to a predetermined driving signal and correcting driving characteristics of at least one of the first and second driving means such that the response characteristics of the first optical system are substantially equalized with those of the second optical system.

With the above arrangement, the response characteristics of the first and second optical systems can always be equally set, and balance adjustment of the response characteristics between the optical systems can be performed. At the same time, a change in characteristics due to a mechanical error such as shaft friction or element deformation caused by the temperature and time change can be corrected.

The invention is particularly advantageous since there can be provided a vibration correction apparatus which corrects a mechanical degradation such as shaft friction or element deformation, or a delay in response due to the temperature and time change of a movement correction means and simultaneously corrects variations due to a difference between individual driving systems, thereby always ensuring satisfactory response characteristics.

In addition, there can be provided an optical device which simultaneously performs balance adjustment of the response characteristics between a plurality of optical systems of an optical device such as a binocular to which the vibration correction apparatus is applied, thereby obtaining a vibration correction characteristic while equalizing the characteristics of the optical systems.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a graph showing the frequency characteristic of a VAP unit so as to explain the embodiment of the present invention;

FIG. 18 is a block diagram showing the arrangement of the vibration detection/correction system of the binocular, which is common to the second to fourth embodiments.

DETAILED DESCRIPTION OF THE PREFERRED EMBODIMENTS

Preferred embodiments of the present invention will now be described in detail in accordance with the accompanying drawings.

First Embodiment

Figure 1:
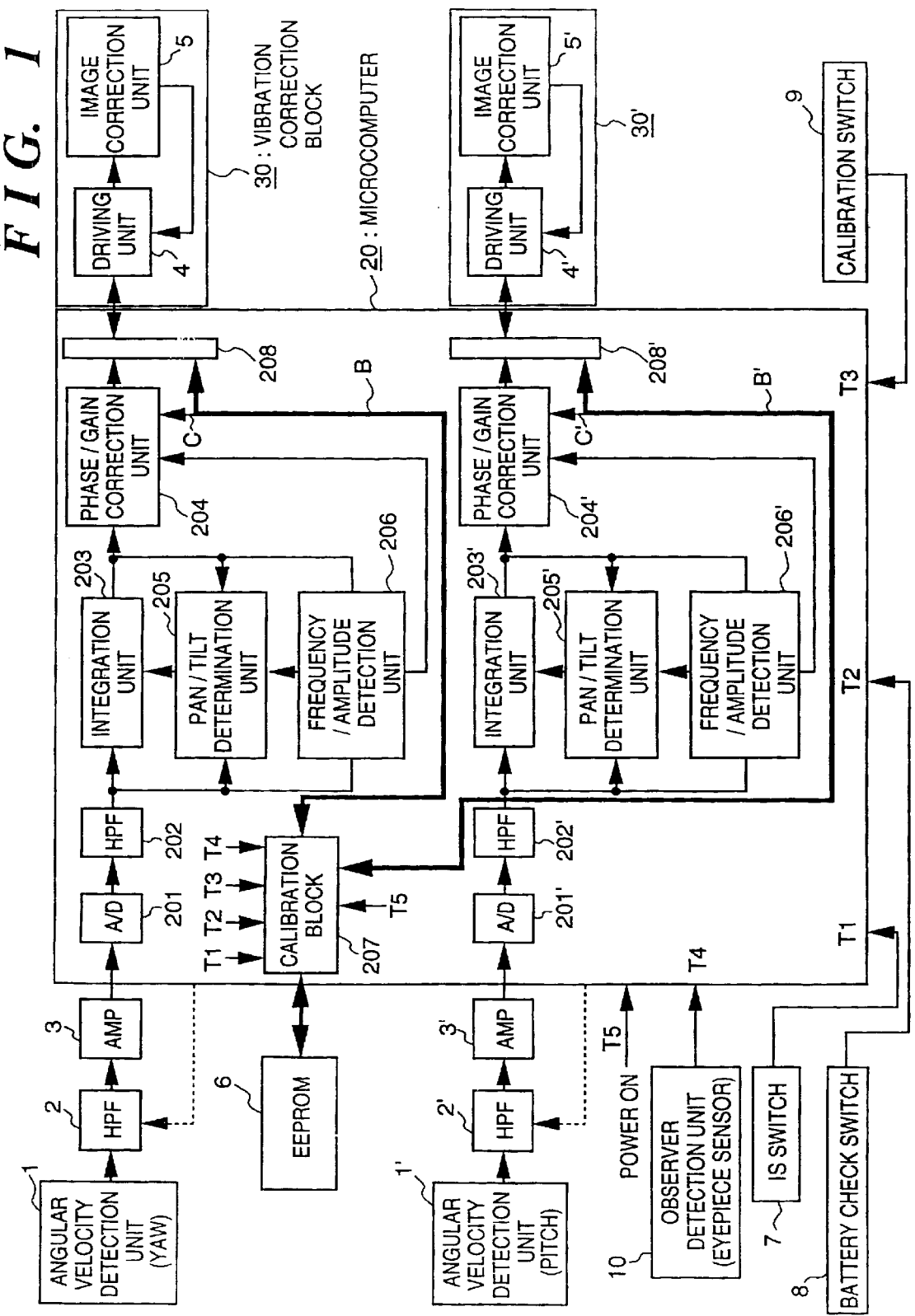
FIG. 1 is a block diagram showing the first embodiment.

FIG. 1 is a block diagram showing the arrangement of a vibration correction apparatus of the present invention, which is applied to a video camera or a VTR integral with a camera.

Referring to FIG. 1, reference numeral 1 denotes an angular velocity detection unit having an angular velocity sensor such as a vibration gyroscope attached to a photographing device such as a camera; 2, a DC cut filter (or a high-pass filter for cutting off a signal in an arbitrary band (to be referred to as an HPF hereinafter)) for cutting off the DC component of an angular velocity signal output from the angular velocity detection unit 1; and 3, an amplifier for amplifying the angular velocity signal to an appropriate sensitivity.

A microcomputer 20 serves as a control means which receives the angular velocity signal output from the amplifier 3 and calculates and outputs a vibration correction signal for driving a variable angle prism (VAP) serving as an image correction means in a vibration correction block 30 (to be described later). The internal arrangement of the microcomputer 20 is realized by software. In this embodiment, to clarify means and functions constituting the present invention, the respective functions are represented as blocks.

A region other than the various blocks in the microcomputer 20 corresponds to a system control unit which controls transfer of various data and instructions between the blocks shown in FIG. 1, thereby controlling the entire system. More specifically, the microcomputer 20 incorporates a CPU, a ROM holding a control program realized by the CPU, a RAM, and the like.

In the microcomputer 20, an A/D converter 201 converts the angular velocity signal output from the amplifier 3 into a digital signal. An HPF 202 having a function of changing characteristics in an arbitrary band can perform phase compensation and passes a frequency component detected as a vibration.

An integration unit (integrator) 203 integrates the angular velocity signal and converts the angular velocity signal into an angular displacement signal corresponding to a vibration correction amount. A phase/gain correction unit 204 is arranged on the output side of the integration unit 203 to integrate the angular velocity signal, convert the signal into an angular displacement signal, and calculate a vibration correction amount, thereby correcting the phase and gain of the system.

Note that the phase/gain correction unit 204 incorporates a D/A converter (not shown) so that the phase/gain correction unit 204 can convert an input digital angular displacement signal into an analog output and output the analog signal. When the output from the D/A converter passes through a limiter, the amplitude of a vibration correction control signal is limited. With this arrangement, the driving range of the VAP can be limited to correct a mechanical offset caused by, e.g., a temperature and time change, as will be described later. In addition, when the vibration correction apparatus of the present invention is applied to a binocular, balance adjustment for left and right vibration correction means can be performed. Such driving range correction can be performed through a control data line C.

A vibration correction block 30 corrects the movement of an image due to a vibration on the basis of an angular displacement signal output from the phase/gain correction unit 204 in the microcomputer 20. The vibration correction block 30 has an image correction unit 5 consisting of elements and mechanisms for correcting an image blur and an actuator for driving them, and a driving unit 4 serving as a driving means for driving the image correction unit 5.

A VAP including a driving actuator for correcting the movement of an image due to a vibration in accordance with an output from the driving unit 4 is used as the image correction unit 5 in this embodiment. Using the VAP, the optical axis is displaced in a direction to cancel the movement caused by the vibration, thereby correcting the movement of the image caused by the vibration.

The arrangement in the microcomputer 20 will be described further. A pan/tilt determination unit 205 determines a panning/tilting and photographing states. A frequency/amplitude detection unit 206 detects a vibration frequency and amplitude on the basis of an angular velocity signal.

The pan/tilt determination unit 205 receives an angular velocity signal from the HPF 202 and an angular displacement signal output from the integration unit 203. If the angular displacement signal monotonically increases or decreases in a predetermined direction while the angular velocity signal does not change, the pan/tilt determination unit 205 can determine panning or tilting.

In this determination, when the amplitudes and frequencies of the angular velocity signal and the angular displacement signal are detected by the frequency/amplitude detection unit 206 simultaneously, the vibration frequency is low, and the amplitude increases or decreases in a predetermined direction, panning or tilting can be determined. This information is supplied to the pan/tilt determination unit 205.

When panning or tilting is detected by the pan/tilt determination unit 205 and the frequency/amplitude detection unit 206, the integration characteristic of the integration unit 203, i.e., the cut-off frequency in the low band is shifted to the high-frequency side, thereby degrading the vibration correction function in the low band. With this processing, the movement correction function in a panning/tilting operation is degraded, thereby preventing an offset of vibration correction by the VAP.

By detecting the vibration frequency by the frequency/amplitude detection unit 206, the frequency characteristic of the integration unit 203 can be set to the center frequency of the vibration. With this processing, even when the vibration frequency changes, the maximum vibration correction effect with respect to the vibration frequency can be obtained. That is, optimum vibration correction control can be performed in accordance with the vibrated state.

The information of the vibration frequency and amplitude, which are detected by the frequency/amplitude detection unit 206, is supplied to the phase/gain correction unit 204. Phase/gain compensation is simultaneously performed when the frequency characteristic in the integration characteristics of the control system is changed in accordance with the vibration frequency and amplitude. Therefore, the stability of the control system can always be maintained, and a high correction capability can be realized for any kind of vibration. At the same time, a highly precise and stable system with a high reliability can be realized.

As described above, in the microcomputer 20, an angular velocity signal (an output from the amplifier 3) is converted into a digital value by the A/D converter 201, and converted into an angular displacement signal by the integration unit 203.

The pan/tilt determination unit 205 constitutes a determination means for determining the panning/tilting and photographing states by using the angular velocity signal output from the A/D converter 201 and the angular displacement signal output from the integration unit 203. On the basis of the determination result, the frequency characteristic of the integration unit 203 is changed and shifted to the high frequency side in a panning/tilting operation, as described above. With this operation, the VAP is prevented from coming to the end opposite to the panning (tilting) direction so that vibration correction on the high frequency side can be performed even during a panning operation.

Therefore, the integration unit 203 is assumed to have characteristics of cutting off the low frequency range.

The frequency/amplitude detection unit 206 is a frequency/amplitude detection means for receiving an angular velocity signal (an output from the A/D converter 201) and an angular displacement signal (an output from the integration unit 203). On the basis of the detected frequency and amplitude, correction is performed by the phase/gain correction unit 204.

The corrected angular displacement signal is converted into an analog value by the D/A converter (not shown) in the phase/gain correction unit 204, or output from the microcomputer 20 as, e.g., a PWM (Pulse Width Modulation) pulse output. The output is supplied to the driving unit 4 in the vibration correction block 30, and the image correction unit 5 consisting of the VAP is driven. With this operation, the vibration is suppressed, and a stable image can be obtained.

The above-described phase/gain correction can be performed by changing the frequency characteristic of the HPF 2, as indicated by a dotted line in FIG. 1, instead of using the phase/gain correction unit 204.

An IS switch 7 selects the operative or inoperative state of the vibration correction function. The ON/OFF state of the IS switch 7 is fetched by the microcomputer 20 through a data line T1.

The power-ON state of the apparatus is fetched as a power on signal by the microcomputer 20 through a data line T5.

A battery check switch 8 is used to perform to check the remaining battery amount. The operated state is read by the microcomputer 20 through a data line T2.

A calibration switch 9 is used to perform a calibration operation as a characteristic feature of the present invention (to be described later), and its operated state is read by the microcomputer 20 through a data line T3.

Figure 12:
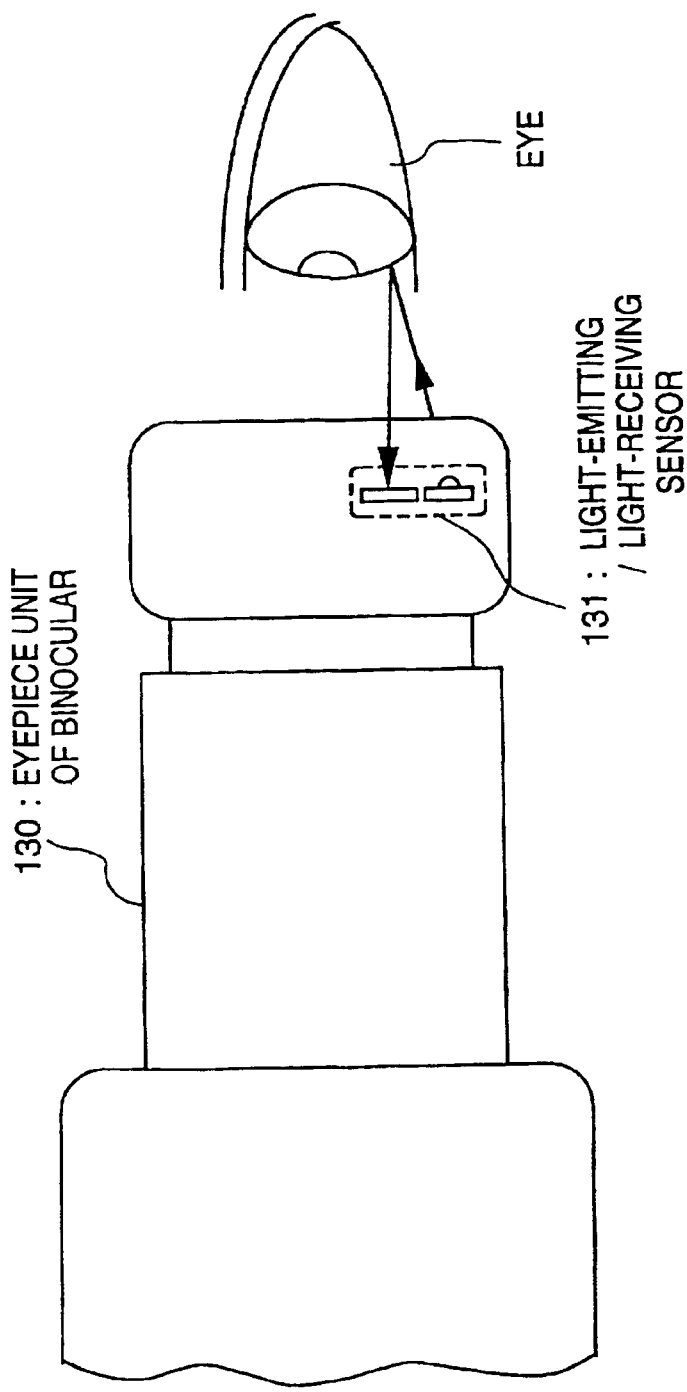
FIG. 12 is a view for explaining the arrangement of an observer detection means for detecting whether an observer is looking through a finder eyepiece unit.

An observer detection unit 10 detects the proximity of an eye of an operator (observer) to the eyepiece unit of the video camera of the present invention, thereby setting the apparatus in an operative state. The observer detection unit 10 has a light-emitting/light-receiving sensor 131 in an eyepiece unit 130 of, e.g., a video camera or a binocular, as shown in FIG. 12. With this arrangement, an infrared ray is irradiated on an eye EYE of the operator, and the proximity of the eye is detected from the reflected light beam. This arrangement can be realized by an eye detection device which is recently used to set a distance measurement area for autofocusing in a camera. The state of the observer detection unit 10 is read by the microcomputer 20 through a data line T4.

The characteristics (cut-off frequency) of the HPF 2 (or the HPF 202) and the integration unit 203 can be changed by the microcomputer 20 when the IS switch 7 is turned on, or when the power is turned on.

These characteristics can be arbitrarily set, or the correction function can be changed to absorb the variations in individual VAPs by using an EEPROM 6 serving as a storage means (to be described later).

The VAP which is used as the image correction unit 5 in the vibration correction block 30 to optically displace the optical axis and cancel a vibration will be described below.

Figure 5:
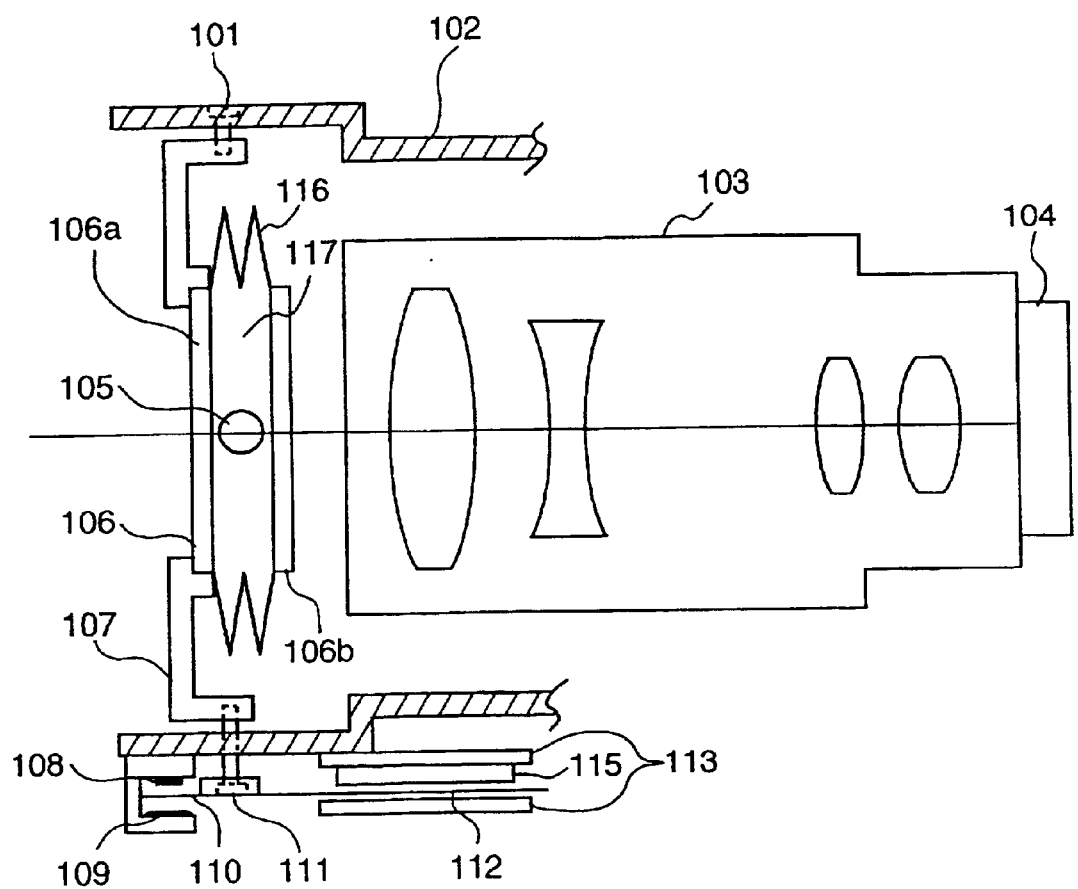
FIG. 5 is a sectional view showing the arrangement of a photographing optical system incorporating a VAP.

FIG. 5 is a sectional view showing the arrangement using the VAP as the image correction unit 5. This is a closed-loop control system in which a voice coil type motor is used to drive the prism, and the angular displacement of the prism is detected by an encoder and fed back. In FIG. 5, reference numeral 106 denotes a VAP.

Figure 8:
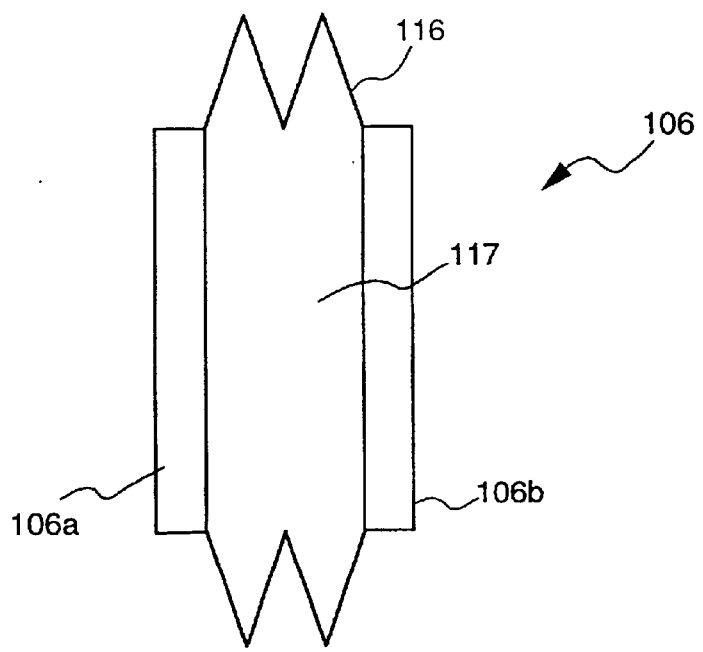
FIG. 8 is a view showing the structure of the VAP so as to explain the embodiment of the present invention.

FIG. 8 is an enlarged view of the VAP 106. As shown in FIG. 8, the VAP 106 is constituted by sandwiching a transparent elastic body or inert fluid 117 with a high refractive index (refractive index n) between two transparent parallel plates 106*a* and 106*b* opposing each other, and elastically sealing the outer surface with a sealing material 116 such as a resin film. The transparent parallel plates 106*a* and 106*b* are swingably arranged.

Figure 9:
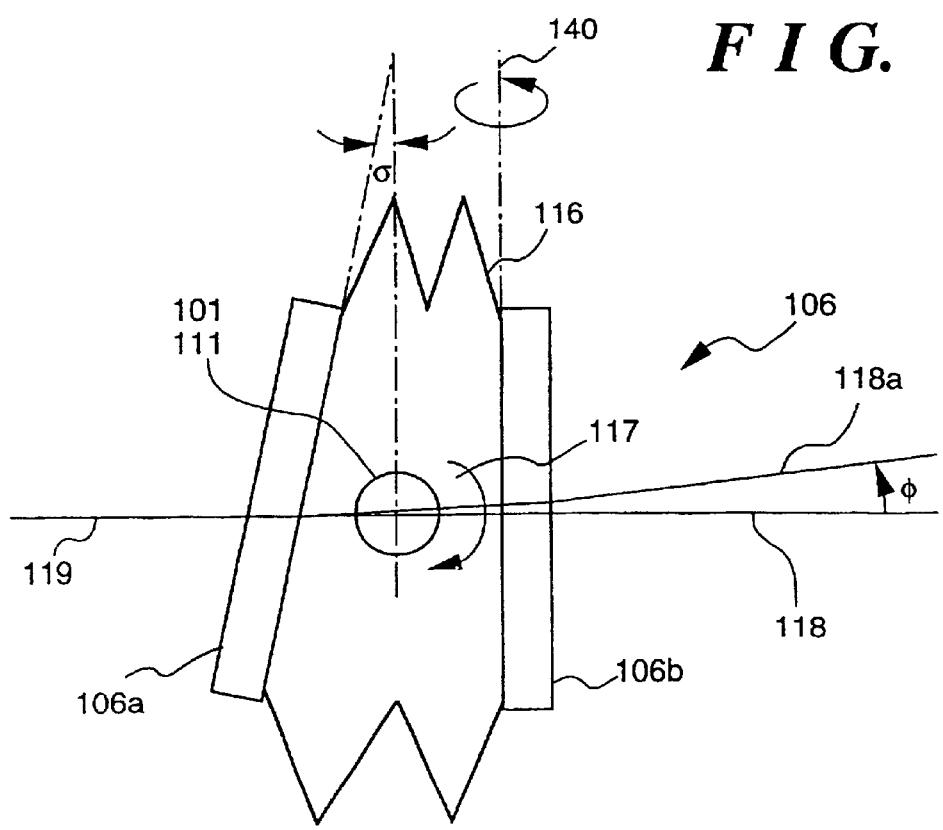
FIG. 9 is a view showing the structure of the VAP so as to explain the embodiment of the present invention.

FIG. 9 is a view showing a state wherein an incident light beam 119 passes through the VAP 106 when the transparent parallel plate 106*a* in FIG. 8 is pivoted about a swing shaft 101 (111) by an angle s. As shown in FIG. 9, the incident light beam 119 incident along the optical axis is deflected by an angle $\emptyset=(n-1)s$ and emerges in accordance with the same principle as of a sphenoidal prism. That is, an exit light beam 118 is decentered (deflected) by the angle $\emptyset$, as indicated by reference numeral 118*a*.

Referring back to FIG. 5, the VAP 106 is fixed to a lens barrel 102 through a holding frame 107 to freely pivot about the swing shafts 101 and 111.

A yoke 113, a magnet 115, and a coil 112 constitute a voice coil type actuator so that, when a current flows through the coil 112, the angle of the VAP 106 can be changed about the swing shaft 111. A slit 110 moves together with the rotating shaft 111.

A light-emitting diode 108 and a PSD (Position Sensing Detector) 109 constitute, together with the slit 110, an encoder for detecting the angular displacement of the VAP. A light beam whose incident angle is changed through the VAP 106 is formed into an image on the surface of a CCD 104 through a lens group 103. Reference numeral 105 denotes a central axis serving as a swing center of the VAP 106.

Figure 6:
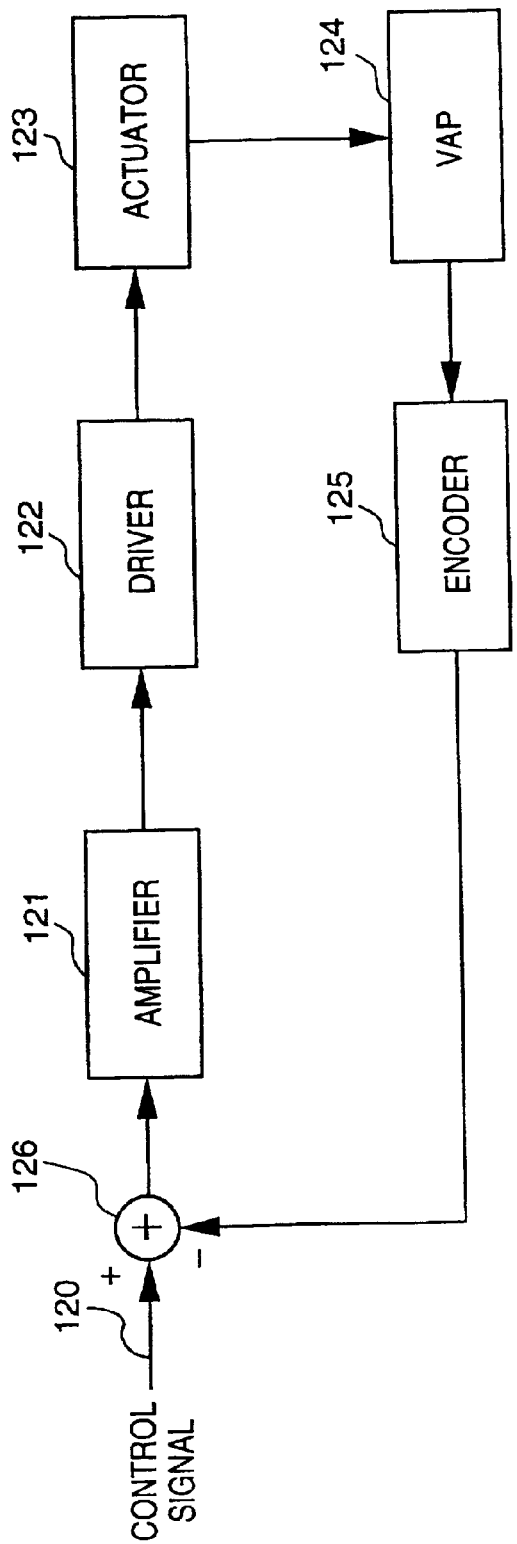
FIG. 6 is a block diagram showing the basic arrangement of a VAP driving circuit.

FIG. 6 is a block diagram showing the basic control system with the above-described arrangement.

Reference numeral 121 denotes an amplifier; 122, a driver; 123, an actuator; 124, a VAP; and 125, an angular displacement encoder for detecting the angle of the VAP 124. A vibration correction control signal 120 and an output signal output from the angular displacement encoder 125 are added by an adder 126 in opposite polarities.

Therefore, control is performed such that the control signal 120 is equalized with the output signal from the angular displacement encoder 125. As a result, the control signal 120 is equalized with the output from the angular displacement encoder 125.

In fact, however, the VAP 124 (without velocity feedback compensation) having the arrangement as shown in FIG. 5 has a frequency characteristic shown in FIG. 10. The frequency characteristic (gain/phase) in polarization of the optical axis by 0.03 deg largely differs from that in polarization by 0.1 deg (almost the same response is observed in the low-frequency band although not illustrated).

For example, at 10 Hz, the phase in polarization by 0.03 deg delays 7 deg with respect to that in polarization by 0.1 deg.

This delay is caused by the influence of shaft friction or characteristics of each VAP element and preferably solved by mechanical improvement or the like.

However, a degradation in responsiveness is caused due to the above reason, which cannot be neglected for vibration correction performance. As a countermeasure for control, in this embodiment, an appropriate gain is set in accordance with the vibration amplitude, thereby changing the gain in accordance with the amplitude of the periodical vibration applied to the device, as shown in the flow chart of FIG. 7 (to be described later).

In this embodiment, by using the above technique, satisfactory correction can be performed even for a vibration at 10 Hz or more for which correction is relatively difficult because of the characteristics of the existing vibration gyroscope and the vibration correction apparatus having a mechanism for performing polarization of the optical axis by mechanical driving, as described above.

Actually, the correction effect changes depending on the correction value for phase advance and the frequency at which optimization is performed (in this embodiment, optimization is performed at 10 Hz). However, when camera shake correction is mainly considered, i.e., when frequency adaptive control is not performed, the correction effect for a frequency of 10 Hz or more is degraded.

Figure 11:
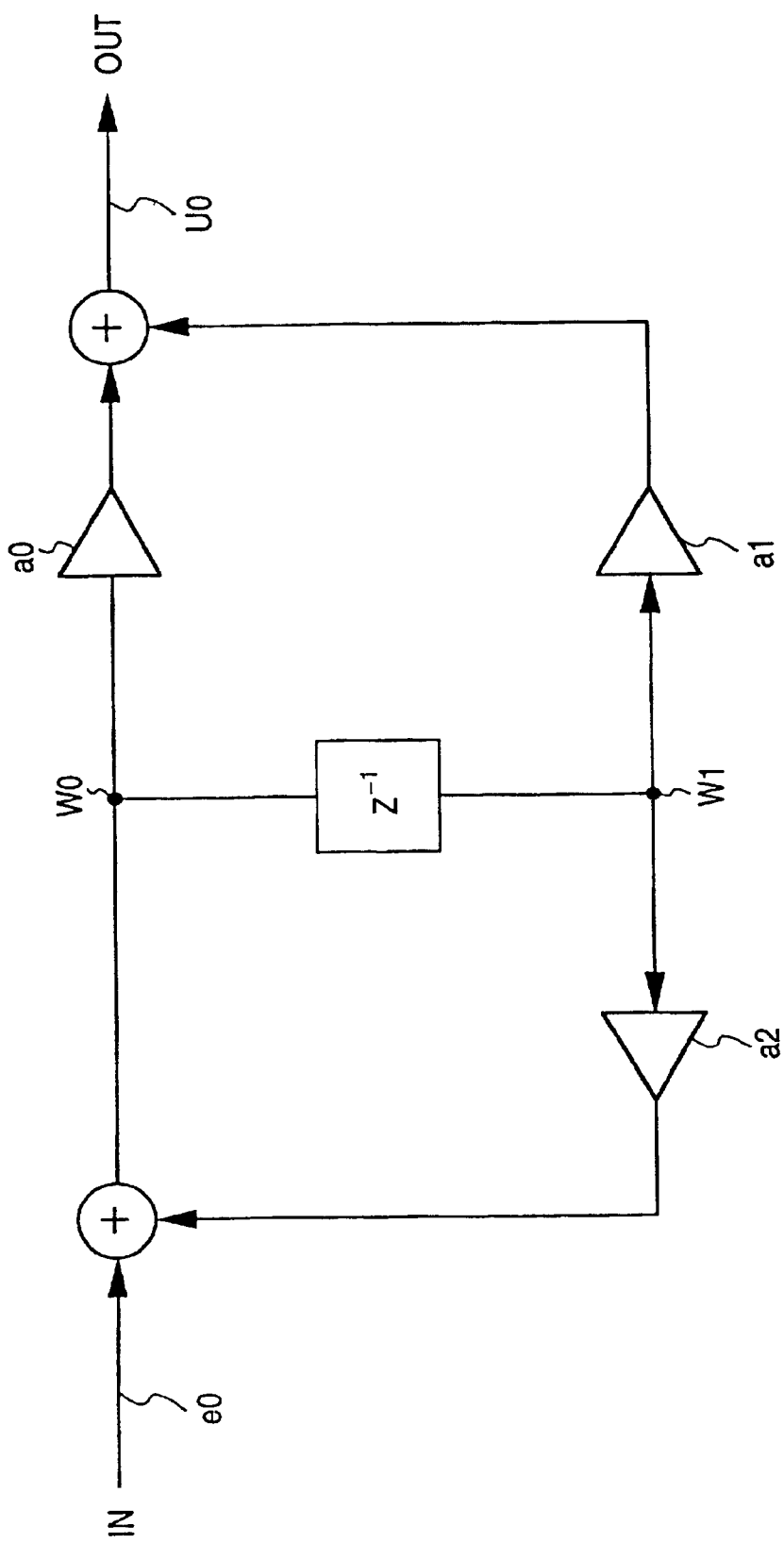
FIG. 11 is a block diagram showing the arrangement of a digital filter constituting an HPF, an integration means, a gain/phase correction means, and the like in the embodiment of the present invention.

The control system of this embodiment using the VAP as the image correction unit 5 will be described below in detail. To realize the characteristics of the HPF 202, the integration unit 203, and the phase/gain correction unit 204 in FIG. 1 in the microcomputer 20, a digital filter must be used. As such a digital filter, for example, a primary IIR filter shown in FIG. 11 can be used. In FIG. 11, the digital filter is realized by the following calculations:

$$u0 = a0ow0 + a1ow1$$

$$w0 = e0 + a2ow1$$

$$w1 = w0 (w1 \text{ is a state variable})$$

where
 e0: input
 u0: output
 a0, a1, and b1: filter coefficients.

When the filter coefficients a0, a1, and a2 are changed, the frequency characteristic can be set. Data of the corresponding filter coefficients a0, a1, and a2 are prepared as a table. The above calculations for the IIR filter can be performed using the filter coefficients obtained upon retrieval in the above table.

Since the HPF 202, the integration unit 203, and the phase/gain correction unit 204 are realized using a digital filter, the sampling period must be relatively high (e.g., 1 kHz or more). However, the pan/tilt determination unit 205 and the frequency/amplitude detection unit 206 for determining the panning/tilting and photographing states can be set for processing at a relatively low period (e.g., 100 Hz).

The processing of the microcomputer 20 in normal vibration correction with this arrangement (when the calibration switch 9 is OFF) will be described below with reference to the flow charts of FIGS. 7A and 7B.

Figure 7A:
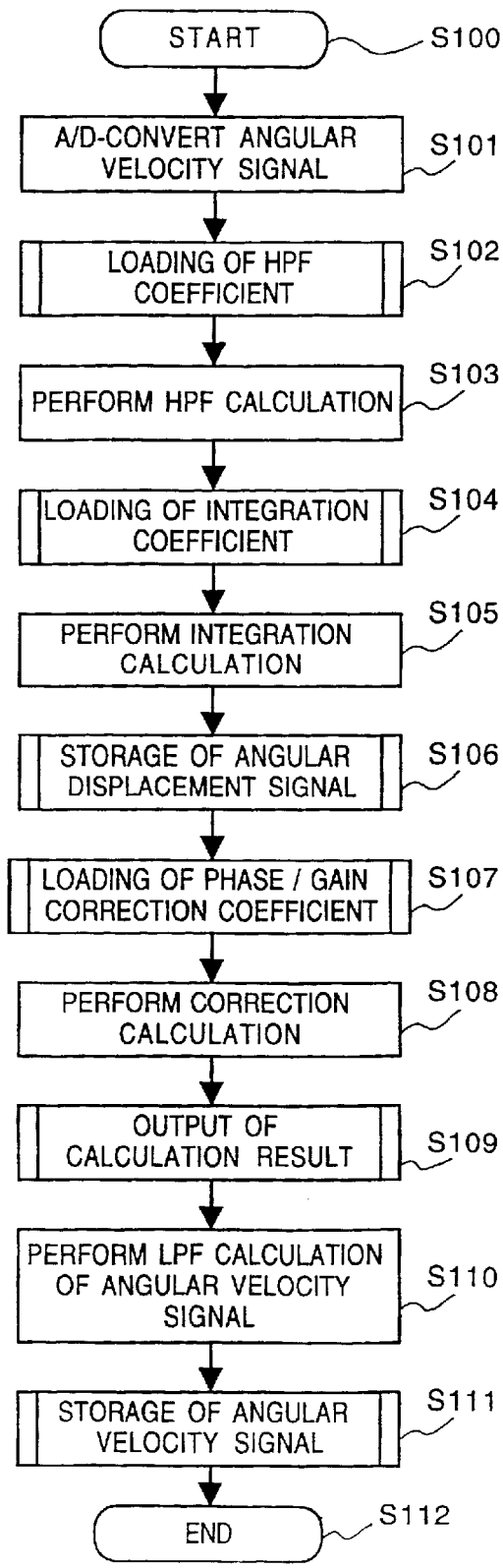
FIGS. 7A and 7B are flow charts for explaining the control operation of a vibration correction system using the VAP.

FIG. 7A is a flow chart associated with calculation of a vibration angular displacement signal for driving the image correction unit 5 such as a VAP.

In step S100, processing is started.

In step S101, an angular velocity signal from the angular velocity sensor constituting the angular velocity detection unit 1 is supplied to the A/D converter 201 through the HPF 2 and the amplifier 3, converted into a digital signal, supplied to the microcomputer 20, and stored.

In step S102, the calculation coefficient (corresponding to each filter coefficient in FIG. 11) of the HPF 202 is loaded from a ROM (not shown).

In step S103, HPF calculation of the angular velocity signal input in step S101 is performed, thereby removing DC and offset components.

In step S104, the integration calculation coefficient for the integration unit 203 is loaded from the ROM (not shown), thereby setting the characteristics of the integration unit 203.

In step S105, the angular velocity signal for which HPF calculation is performed in step S103 is integrated by the integration unit 203 in accordance with the integration coefficient and converted into an angular displacement signal.

At this time, the integration unit 203 can obtain vibration correction characteristics according to the vibration frequency and amplitude detected by the frequency/amplitude detection unit 206, as described above, so that the optimum vibration correction signal according to the vibration frequency can be obtained.

In step S106, the angular displacement signal obtained in step S104 is stored.

In step S107, the phase/gain correction coefficient for the phase/gain correction unit 204 is loaded to determine the correction characteristics of the phase/gain correction unit 204, thereby performing optimum phase/gain correction according to the characteristics of the control system.

In step S108, correction calculation of the angular displacement signal obtained in step S105 is performed in accordance with the determination of the vibration frequency/amplitude and the photographing state, thereby generating a vibration correction control signal.

More specifically, the center frequency of the vibration is detected, and the frequency characteristic of the vibration suppressing force of the vibration correction means is set in accordance with the center frequency. With this processing, vibration correction can be effectively performed with respect to the vibration frequency.

In step S109, the control signal obtained in step S108 is converted into an analog value by the D/A converter (not shown) in the phase/gain correction unit 204 or output as, e.g., a PWM pulse output (not shown) from the microcomputer 20.

In step S110, if noise is large, LPF calculation of the angular velocity signal used for calculation for vibration frequency/amplitude detection, which is used in processing in FIG. 7B (to be described later), is performed, thereby removing the noise.

Figure 7B:
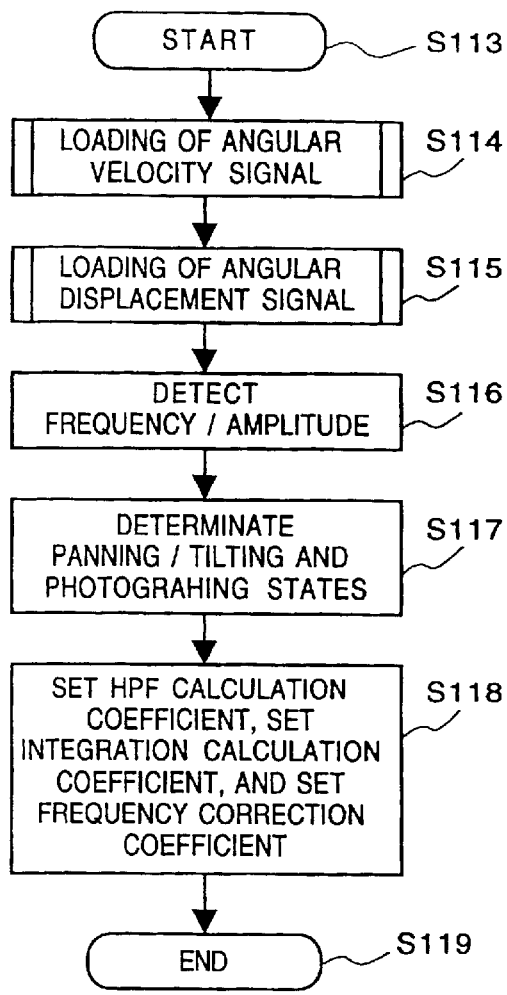

In step S111, the angular velocity signal obtained in step S110 is stored for preparation for the next operation shown in FIG. 7B.

In step S112, the processing is ended.

FIG. 7B is a flow chart showing processing associated with vibration frequency/amplitude detection, detection of the panning/tilting and photographing states, setting of each calculation coefficient, and the like by the pan/tilt determination unit 205 and the frequency/amplitude detection unit 206.

In step S113, processing is started.

In step S114, the angular velocity signal stored in step S111 of FIG. 7A is loaded.

In step S115, the angular displacement signal stored in step S106 is loaded. Note that the order of steps S114 and S115 may be reversed.

In step S116, upon reception of the angular velocity signal and the angular displacement signal obtained in steps S114 and S115, the center frequency and amplitude of the vibration applied to the device are detected.

The vibration amplitude is effectively used for correction processing required when, in an image correction apparatus such as a VAP driven by a servo mechanism, the servo characteristics degrade due to a small amplitude (the follow-up amplitude decreases, i.e., follow-up is disabled in the dead band).

For example, in the vibration correction apparatus using the VAP controlled by a servo mechanism, a degradation in responsiveness, which cannot be neglected for vibration correction performance, is caused due to the mechanical structure or shaft friction for a relatively small vibration (e.g., 0.03 deg or less). In this embodiment, therefore, an appropriate gain is set in accordance with the vibration amplitude, thereby changing the gain in accordance with the amplitude of the periodical vibration applied to the device.

In step S117, upon reception of the angular velocity signal and the angular displacement signal obtained in steps S114 and S115, and the vibration center frequency and amplitude detected in step S116, the panning/tilting and photographing states are determined.

In step S118, on the basis of the determination result of the panning/tilting and photographing states, the HPF calculation coefficient and the integration calculation coefficient are set. More specifically, when the device is in a panning/tilting state, the low cut-off frequency of the integration unit 203 is shifted to the high frequency side, thereby suppressing integration of the low-frequency vibration. With this processing, correction of a very low frequency vibration (panning/tilting) including a DC component is not performed, so that the VAP is prevented from coming to the end.

In addition, the frequency correction coefficient is set in accordance with the vibration center frequency and amplitude obtained in step S116.

In step S119, the processing is ended.

The coefficients according to the panning/tilting and photographing (observing) states are obtained by experience, and a data table prepared in advance is retrieved. To the contrary, the frequency correction coefficient is retrieved from a data table set in units of frequencies. The coefficient of the digital filter formed in the microcomputer 20, as shown in FIG. 11, is changed to change the frequency characteristic.

However, in the vibration correction block 30 which uses a VAP (optical driving means) driven by a servo mechanism using a voice coil motor or the like as an actuator for driving the VAP 5 serving as an image correction means, to improve the follow-up properties to a control signal, a servo control technique, i.e., phase advance/delay compensation, velocity feedback compensation, and change of loop gain are used to improve the frequency characteristic (improve the follow-up properties). However, a degradation in responsiveness, which cannot be neglected for vibration correction performance, is caused due to the mechanical structure or shaft friction for a relatively small vibration (e.g., 0.03 deg or less).

In this embodiment, therefore, an appropriate gain is set in accordance with the vibration amplitude, thereby changing the gain in accordance with the amplitude of the periodical vibration applied to the device.

However, as described above, a degradation in responsiveness (follow-up properties), which cannot be neglected for performance, is caused in some cases with respect to a relatively small vibration (e.g., 0.03 deg or less) due to a mechanical degradation such as shaft friction and element deformation caused by the temperature and time change. In addition, variations in VAPs are large.

In the vibration correction apparatus using the VAP controlled by a servo mechanism, the control center position sometimes shifts due to variations in loads such as the temperature or degradation with time. The driving limit of the VAP also varies due to the temperature, a change in element with time, or consumption of the battery.

Since variations in optical axis adjustment are large, the vibration cannot often be completely absorbed only by adjustment using the offset of an output signal from the one-chip microcomputer.

To solve these problems, according to this embodiment, a vibration correction characteristic measurement function and a calibration function are introduced.

The calibration function is realized by a calibration block 207 provided in the microcomputer 20. The calibration block 207 is connected to the driving unit 4 in the vibration correction block 30 through a control/data bus B to allow two-way communication. The calibration block 207 supplies, to the driving unit 4, a test signal for forcibly driving the VAP in the image correction unit 5 with a reference driving signal having an arbitrary frequency and amplitude, and receives the response characteristics, thereby correcting variations in VAPs, a change with time, and variations in various characteristics.

The calibration block 207 has a means for changing the frequency characteristic of the phase/gain correction unit 204 to detect the response characteristics of the VAP and correct the frequency characteristic (gain/phase) of the control system. A control instruction is supplied through a control data line C which is branched from the bus B and connected to the phase/gain correction unit 204. With this arrangement, a phase delay and a gain error of the VAP are corrected.

The data lines T1 to T5 representing the operation states of the IS switch 7, the battery check switch 8, the calibration switch 9, and the observer detection unit 10 are supplied to the calibration block 207. A calibration operation can be performed in accordance with these signals.

A switch for designating the calibration operation can be freely set. This will be described later in detail.

The calibration block 207 drives the VAP at an arbitrary frequency and amplitude, detects the response amplitude and phase shift with respect to the reference driving signal, and transfers a correction coefficient according to the response amplitude and phase shift to the phase/gain correction unit 204 through the control/data line C to change the frequency characteristic of the phase/gain correction unit 204, thereby correcting the gain and phase shift.

The waveform of the reference driving signal is written in advance in the ROM incorporated in the microcomputer 20. When a response waveform is received using the incorporated A/D converter, the reference signal is read out and compared with the response waveform. With this processing, the frequency characteristic can be obtained. Therefore, no additional element is needed to add the calibration function.

As is apparent from FIG. 1, two vibration detection systems and two vibration correction systems are arranged in the YAW and PITCH directions, respectively. The two systems independently detect a vibration and perform a correction operation. Their control systems can be identical although the direction of vibration to be corrected in one system is different from that of the other system.

In this embodiment, therefore, only the YAW-direction vibration correction system will be described. As for the PITCH direction, the same reference numerals and symbols with a prime (') denote the same constituent elements as in the YAW-direction arrangement, and a detailed description thereof will be omitted.

The image correction means are individually provided in the YAW and PITCH directions. However, the vibration correction means such as a VAP is commonly used, as a matter of course, and actuators for driving the VAP are individually provided in the respective vibration correction directions.

Figure 13:
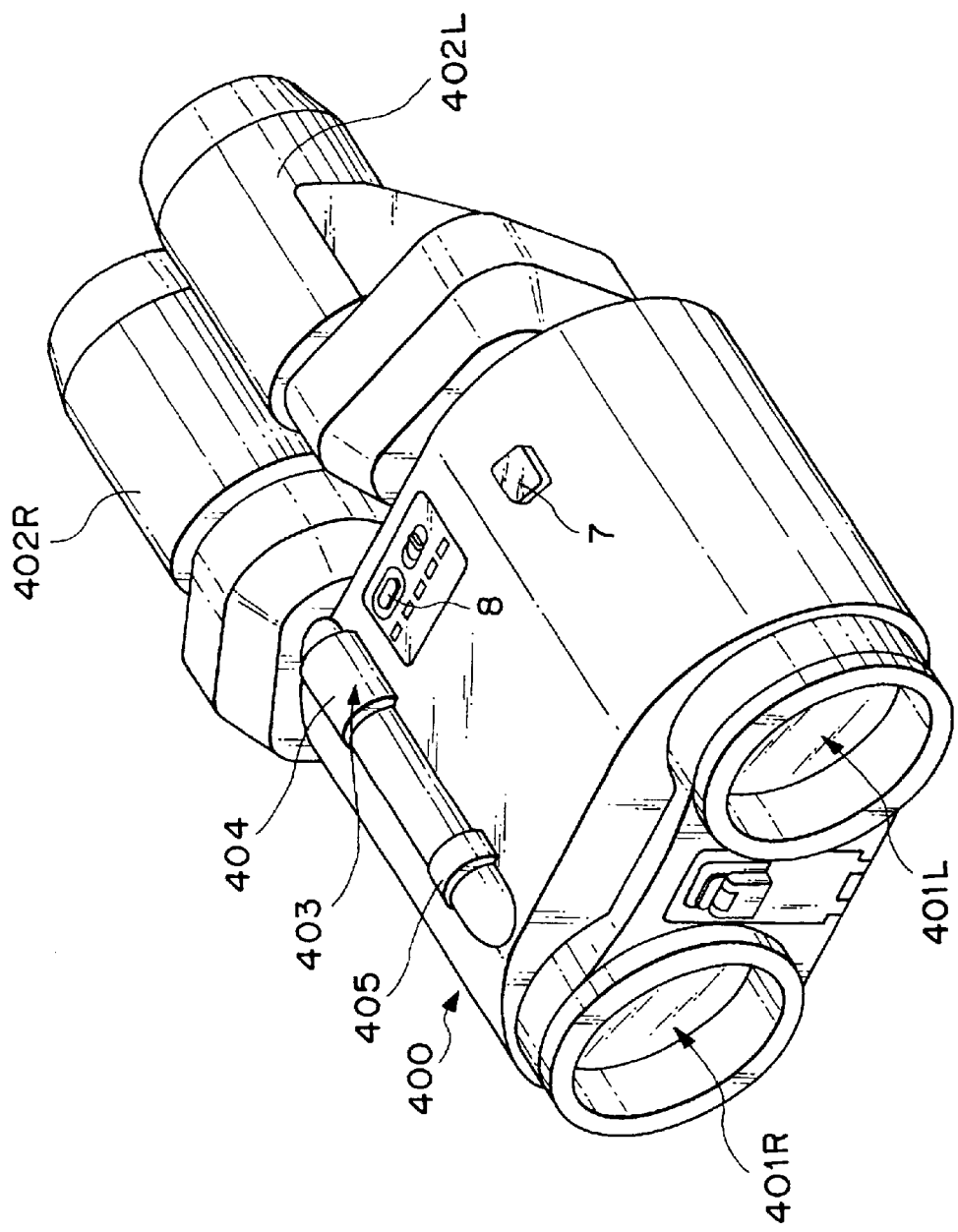
FIG. 13 is a perspective view of a binocular incorporating the vibration correction apparatus of the present invention.
Figure 14:
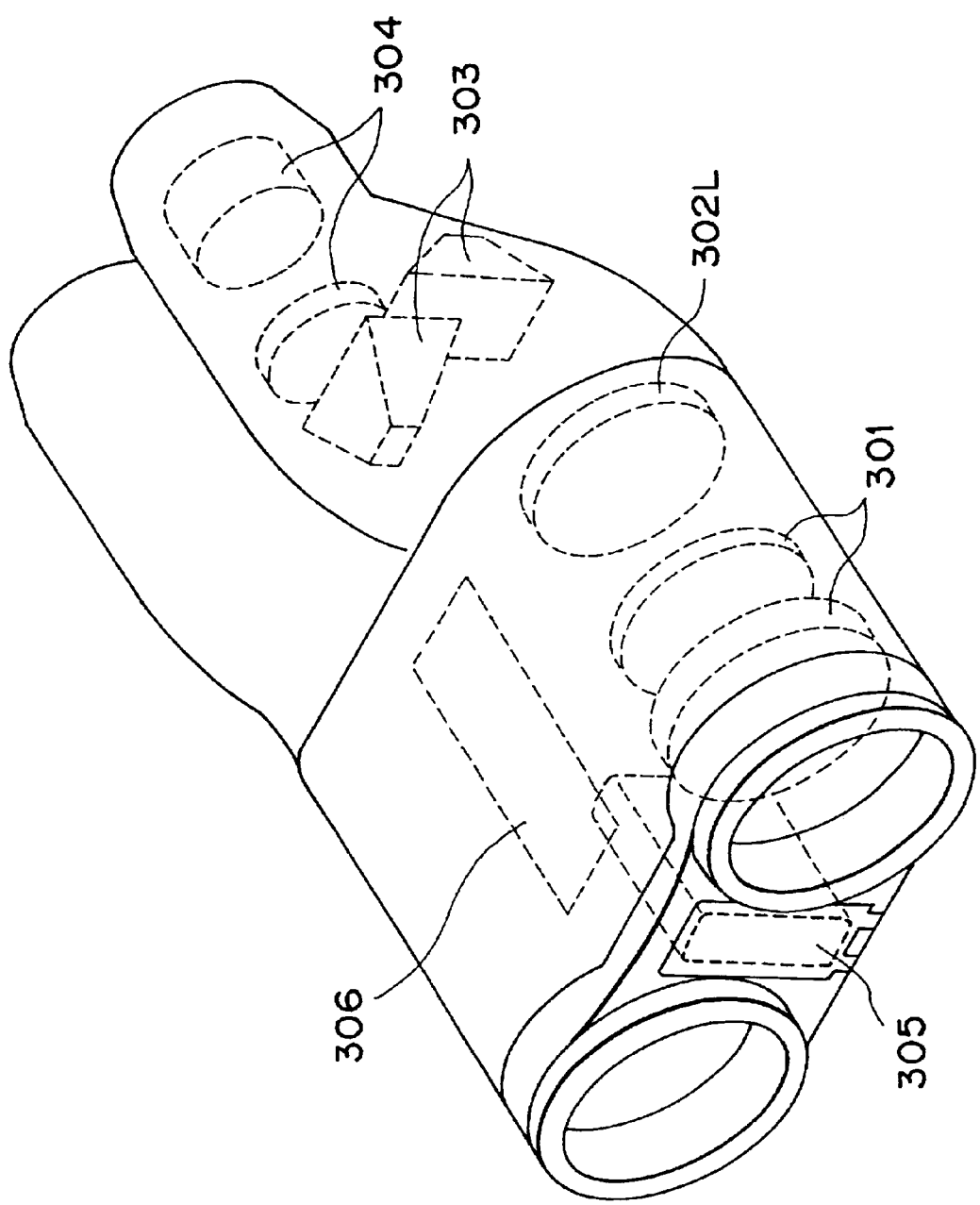
FIG. 14 is a perspective view of the binocular incorporating the vibration correction apparatus of the present invention.

When the present invention is applied to a binocular as shown in FIGS. 13 and 14, two vibration correction systems including VAPs are provided on the left and right sides. This means that one more set of vibration correction systems in the YAW and PITCH directions in FIG. 1 is provided.

However, the arrangement is the same, and an illustration and description thereof will be omitted. FIG. 18 only schematically shows the arrangement (to be described later).

Referring to FIG. 1, in a normal vibration correction operation, a switching block 208 supplies an output from the phase/gain correction unit 204 to the vibration correction block 30. In a calibration operation (to be described later), the switching block 208 switches various control and data lines to connect the bus B to the vibration correction block such that a driving waveform output from the calibration block 207 is supplied to the vibration correction block 30. The switching block 208 serves as an I/O port for the vibration correction block 30.

Figure 2:
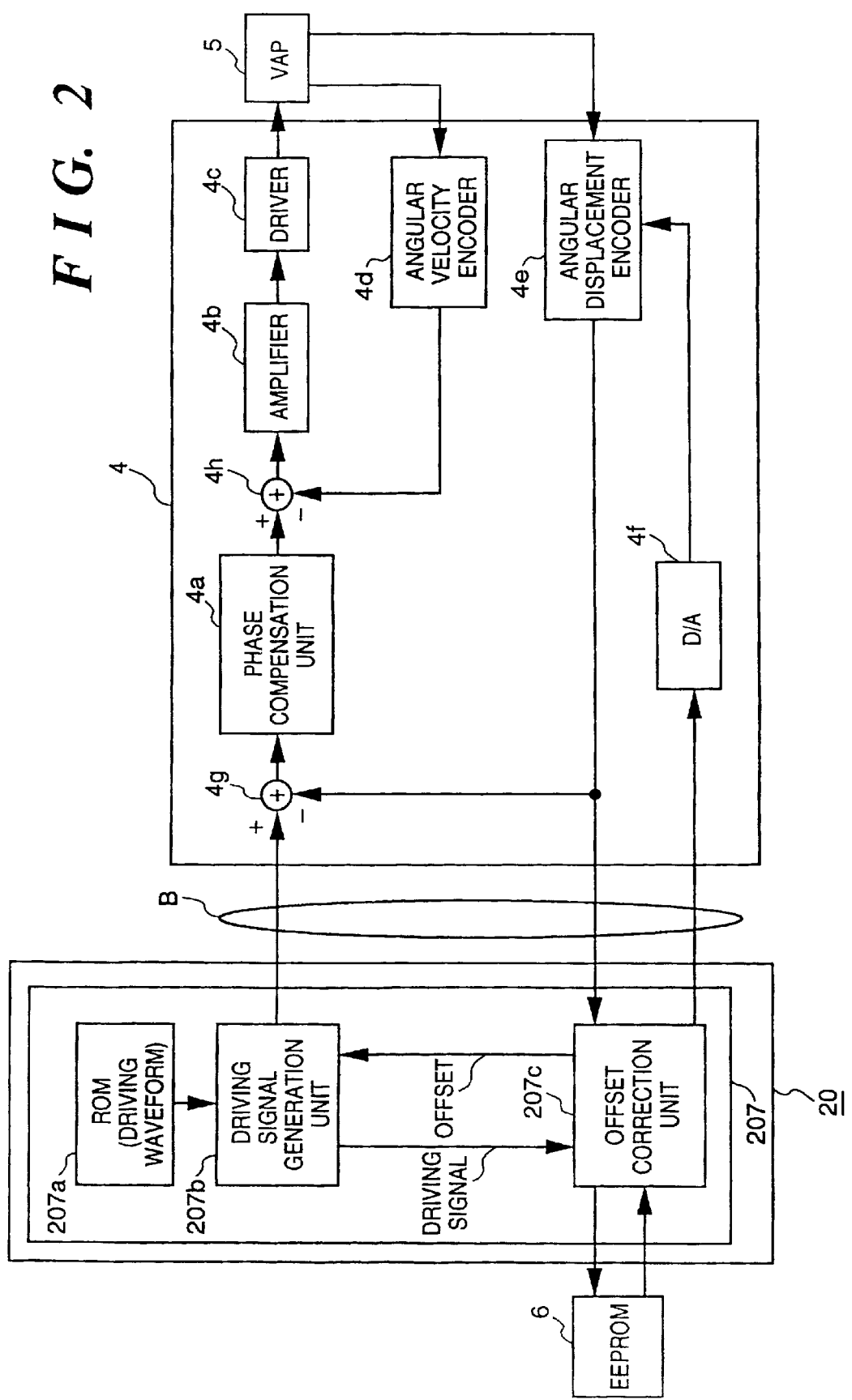
FIG. 2 is a block diagram showing the arrangement of the main part (a calibration block and a vibration correction block) of the embodiment shown in FIG. 1.

FIG. 2 is a block diagram showing the internal arrangement of the calibration block 207 for performing the calibration operation and the vibration correction block 30, and connections therebetween.

As for the internal arrangement of the calibration block 207, a test VAP driving waveform is stored in a ROM 207a in advance. A driving signal generation unit 207b reads out the VAP driving waveform from the ROM 207a and outputs the VAP driving waveform having predetermined frequency and amplitude to the driving unit 4 through the bus B. The test VAP driving waveform is also supplied to an offset correction unit 207c (to be described later).

The offset correction unit 207c comprises a frequency characteristic detection means for detecting the actual response characteristics of the VAP with respect to the test VAP driving waveform generated by the driving signal generation unit 207b, and an offset correction means for comparing the VAP driving waveform with the response characteristics to detect shifts in phase and frequency of the control system, a shift in optical axis center of the VAP, and a shift in driving range of the VAP, thereby correcting these offsets.

The offset correction unit 207c stores the detection results of the frequency and phase characteristics of the VAP driving system in the EEPROM 6. The stored characteristics (i.e., offset information) are read out in the next use to correct the characteristics of the VAP driving circuit so that the VAP is always driven with the optimum characteristics.

The offset correction unit 207c loads the test VAP driving signal and the corresponding actual VAP response signal from an angular displacement encoder 4e. If the center of the vibration waveform has an offset from level 0 in FIG. 3 (when the center shifts), the offset amount information is supplied to the driving signal generation unit 207b such that the level of the test VAP driving signal shifts to equalize its level with the reference level (level 0) as the center of vibration of the response waveform of the VAP.

Figure 3:
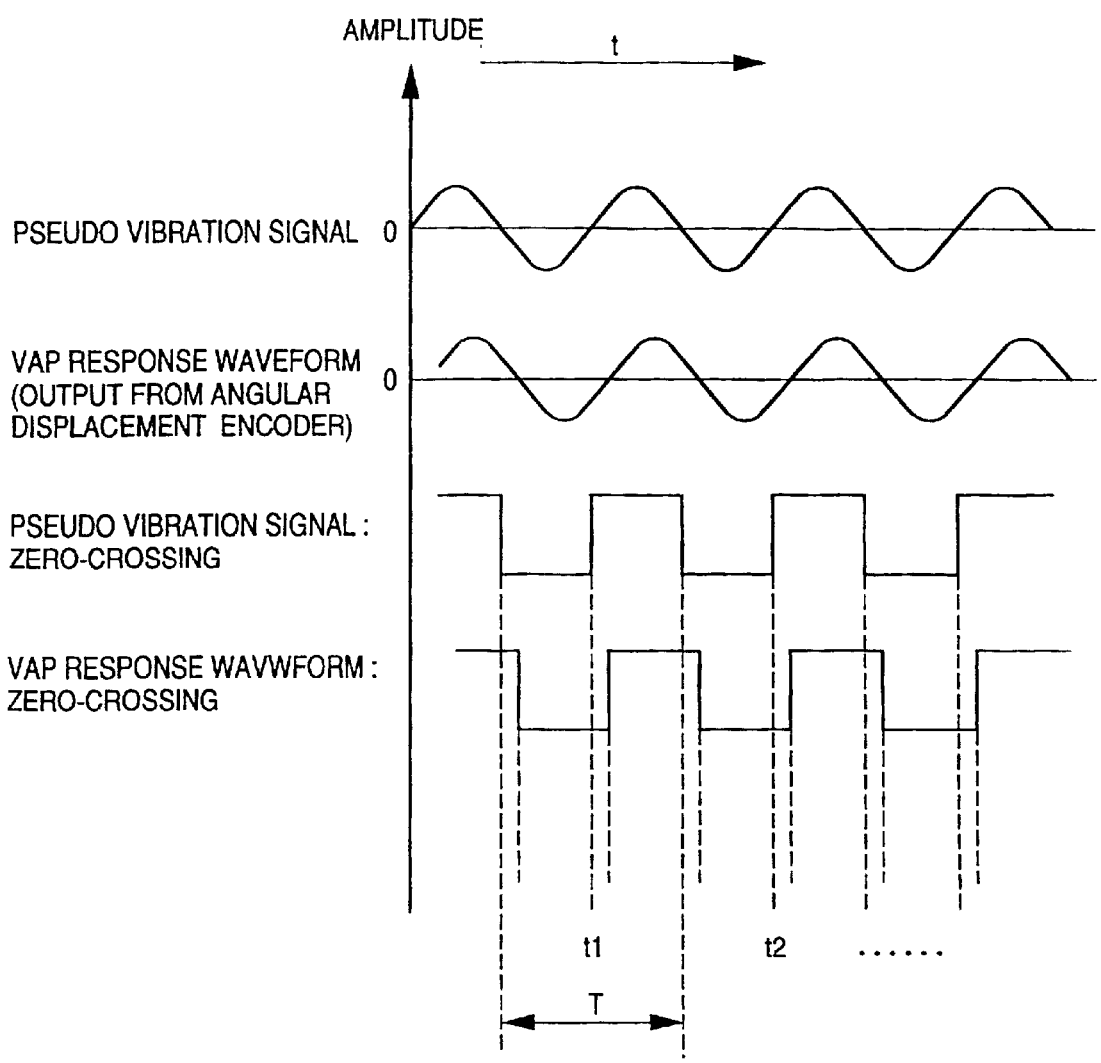
FIG. 3 is a graph for explaining a calibration operation performed by the arrangement shown in FIG. 2.

With this processing, in FIG. 3, the phase delay between the test VAP driving waveform and the response waveform can be properly detected.

Since the value stored in the EEPROM 6 is updated every time the calibration operation is performed, the optimum driving state can be obtained even when a change in environment, such as a time change and a change in temperature, occurs. Information unchangeable after the manufacture need not be updated.

The internal arrangement of the driving unit 4 has a phase compensation unit 4a, an amplifier 4b, and a driver 4c for driving the VAP serving as the image correction unit 5.

An angular velocity encoder 4d detects the angular velocity of the VAP. By feeding back the angular velocity to the input side of the driving unit 4 by an adder 4h, as in FIG. 2, velocity feedback compensation is performed.

The angular displacement encoder 4e detects the moving amount of the VAP serving as the image correction unit 5. As shown in FIG. 2, the moving amount information is fed back to the input side of the phase compensation unit 4a, thereby constituting a displacement loop.

By offset adjustment of an output value from the angular displacement encoder 4e, i.e., by applying a bias to the angular displacement encoder 4e through a D/A converter 4f, the angular displacement of the VAP can be changed to correct the shift in optical axis.

The output from the angular displacement encoder 4e is supplied to the offset correction unit 207c in the calibration block 207. In the offset correction unit 207c, the signal supplied from the angular displacement encoder 4e is compared with the VAP driving waveform, the frequency characteristic of the VAP including the driving unit 4 is calculated, and the offset in optical axis is corrected. This optical axis correction is performed by applying a bias to the angular displacement encoder 4e through the D/A converter 4f to change the angle of the VAP. The EEPROM 6 stores these adjustment values, i.e., offset information.

FIG. 3 is a graph showing a method of measuring a phase delay. First, the offset in VAP response waveform with respect to the test VAP driving waveform (pseudo vibration signal) output from the holding frame 107 is canceled.

As shown in FIG. 3, a time difference tn in timing for crossing the center values of the pseudo vibration signal and the VAP response waveform is measured, and the time differences within a set period T are averaged, thereby calculating the phase delay.

As for a timing for performing characteristic measurement and calibration, a single dedicated switch (calibration switch 9) is arranged such that calibration can be performed at arbitrary time. Alternatively, as in the observer detection unit 10, an eye detection means for detecting reflected light from the eye EYE by using the light-emitting/light-receiving sensor 131 as shown in FIG. 12 is used to detect that the photographing operation is about to be performed. In this case, it is determined whether an observer is looking through the finder. When the IS switch 7 and the battery check switch 8 are depressed while the observer is not looking through the finder, calibration is started, and the response amplitude and phase shift are detected.

More specifically, while the observer is performing a photographing operation, or looking at an object, calibration is not performed. When the observer is not looking at the object, calibration is performed. With this arrangement, the observer can be prevented from looking an unnatural image.

Processing of the microcomputer 20 in characteristic measurement and calibration operation in this embodiment will be described below with reference to the flow chart of FIG. 4. In this example, calibration is performed without using the ON/OFF switch dedicated to calibration (calibration switch 9).

In step S200, processing is started.

In step S201, the state of the IS switch 7 for selecting the operative/inoperative state of the vibration correction function is detected. If the IS switch 7 is ON, the flow advances to step S202 to perform vibration correction.

In step S202, it is determined by the observer detection unit (eyepiece unit sensor) 10 whether the operator (observer) is observing an object through the finder. If YES in step S202, the flow advances to step S211 to execute the routine of a normal vibration correction operation. If NO in step S202, the flow advances to step S203 to execute the calibration operation.

To prevent the calibration operation from being repeatedly performed within a predetermined period of time due to an erroneous operation or the like, if the subsequent calibration operation is performed within the predetermined period of time, the flow may return to step S201 instead of advancing to step S203.

In step S203, a VAP center reference holding signal is output from the calibration block 207 in the microcomputer 20 such that the optical axis of the VAP coincides with that of the photographing system. In initial adjustment, polarization of the VAP matches the optical center. However, in the VAP controlled by the servo mechanism as shown in FIG. 5, the control position actually shifts mainly due to shaft friction or element deformation caused by the temperature and time change.

When the center reference holding signal for positioning the VAP at the optical axis center is applied, the light beam is polarized from the optical center.

In step S204, processing of performing offset correction of optical polarization is performed. More specifically, to cope with the above phenomenon, an offset is applied to the VAP center reference holding signal such that the output from the angle sensor coincides with the stored value of the optical center position obtained in initial adjustment. This correction offset value is stored in the EEPROM 6.

In step S205, a pseudo driving waveform is output from the calibration block 207 in the microcomputer 20.

The pseudo driving waveform has been stored on the ROM 207a in the calibration block 207, so that various driving waveforms (amplitudes and frequencies) can be set.

In step S206, the angular displacement signal output from the angular displacement encoder 4e for detecting the angular displacement of the VAP is fetched by the calibration block 207 through the bus B. At this time, the angular displacement signal is A/D-converted in the offset correction unit 207c.

In step S207, the VAP driving waveform (pseudo driving waveform) supplied from the calibration block 207 is compared with the VAP response waveform, thereby obtaining the shift in response characteristics, i.e., the gain and phase delay, as described above with reference to FIG. 3.

In step S208, the VAP response characteristics detected in step S207 (i.e., the frequency characteristic) are calculated. On the basis of the calculation result, the optimum correction parameter (frequency characteristic correction coefficient) is selected from the data table which stores a plurality of frequency correction coefficients prepared in advance.

In step S209, the frequency correction coefficient is stored in the EEPROM 6. With this calibration processing, in the routine of the normal vibration correction operation shown in step S211, the correction parameter (data table) stored in the EEPROM 6 is used to control vibration correction. Therefore, even when a mechanical error or a time change in element itself is present, the error can be corrected to operate the device with the optimum characteristics.

In step S210, the calibration operation is ended, and the processing is ended.

In the above calibration operation, the measurement frequency and amplitude of the VAP driving waveform (pseudo driving waveform) can be arbitrarily set. To recognize the characteristics, measurement at one or two points performed in accordance with a typical frequency and amplitude suffices. For characteristics shown in FIG. 10, measurement at 10 Hz and ±0.1 deg can be performed to select the correction parameter.

With the above arrangement, when calibration is performed in this embodiment, optimum vibration correction (adaptive control) can be performed in correspondence with the mechanical degradation such as shaft friction or element deformation caused by the temperature and time change.

Second Embodiment

In the first embodiment, calibration processing associated with the frequency characteristic of a VAP driving signal has been mainly described. Additionally, calibration of the VAP driving range is also effective.

In some cases, the driving range (polarization enable range) decreases as compared to the initial state due to the temperature and time change of a VAP element and the like. When a single VAP unit is used, a decrease in vibration correction range mainly poses a problem. However, particularly in, e.g., a binocular using a plurality of sets of VAP units, as will be described below, a difference in observation fields between the left and right optical systems may be caused, resulting in a discomfort to the observer.

As an optical device having two or more independent image correction means, FIG. 13 shows a perspective view of a binocular incorporating left and right independent VAP units.

Referring to FIG. 13, reference numeral 400 denotes a binocular main body; 401L and 401R, objective lens units; and 402L and 402R, a pair of eyepiece prism unit main bodies provided in the binocular main body 400.

A dioptric/focus adjustment mechanism 403 is arranged between the objective lens units 401L and 401R.

Reference numeral 404 denotes a focus adjustment ring; and 405, a dioptric adjustment ring.

Vibration detection sensors (not shown) for detecting vibrations in the vertical and horizontal directions are fixed to the binocular main body 400.

A correction operation switch 7 is used to set the operative/inoperative state of vibration correction and operated by, e.g., a depressing operation.

FIG. 14 is a perspective view showing the arrangement of the vibration correction apparatus in the binocular. Reference numeral 301 denotes an objective lens group including a focus lens; 302L, a VAP unit; 303, an erect prism; 304, as eyepiece lens group; 306, a control circuit board; and 305, a battery for supplying power to the vibration correction apparatus.

The VAP unit 302L is arranged on the left side of the binocular. However, a VAP unit 302R provided on the right side is also present, as a matter of course. The VAP units 302L and 302R are mechanically arranged in a symmetrical layout. However, the left and right inertial forces differ from each other in some cases because of its structure.

A calibration operation by a microcomputer 20 in the second embodiment will be described below. In the second embodiment, two sets of left and right vibration correction blocks are arranged in the YAW and PITCH directions to perform calibration processing for the binocular.

Therefore, unlike the above first embodiment using only a single vibration correction system (calibration of a single VAP), balance adjustment between the left and right vibration correction systems is important.

Although FIG. 1 only shows a single vibration detection/correction system, one more single vibration detection/correction system as shown in FIG. 1 is arranged in the microcomputer 20, and these systems constitute the left and right vibration detection/correction systems of the binocular, respectively. Balance adjustment between the left and right systems is performed by the microcomputer 20.

FIG. 18 is a block diagram showing the arrangement of the vibration detection/correction system of the binocular. Referring to FIG. 18, the right-side optical system will be described first. Reference numerals 1R and 1R' denote YAW- and PITCH-direction angular velocity detection units. YAW- and PITCH-direction vibration correction blocks 30R and 30R' are connected to the right-side VAP 302R.

In the microcomputer 20, YAW- and PITCH direction integration units 203R and 203R', and YAW- and PITCH-direction phase/gain correction units 204R and 204R' are arranged.

The left-side optical system will be described. YAW- and PITCH direction angular velocity detection units 1L and 1L' are commonly used as the angular velocity detection units 1R and 1R' of the right-side optical system. With this arrangement, identical angular velocity signals can be supplied to the left and right optical systems. YAW- and PITCH-direction vibration correction blocks 30L and 30L' are connected to the left-side VAP 302L.

In the microcomputer 20, YAW- and PITCH direction integration units 203L and 203L', and YAW- and PITCH-direction phase/gain correction units 204L and 204L' are arranged.

A calibration block 207 performs calibration of the right-side vibration correction system in the YAW and PITCH directions and calibration of the left-side vibration correction system in the YAW and PITCH directions. A test driving signal in the calibration operation and outputs from the phase/gain correction units 204R, 204R', 204L, and 204L' in a normal vibration correction operation are appropriately switched by a switching block 208 in accordance with the operation mode and supplied to the corresponding vibration correction block.

An EEPROM 6 stores offset information of these four systems.

The microcomputer 20 detects the offset information of each of the left and right optical systems, which consists of shifts in frequency characteristic of the phase/gain in the YAW and PITCH directions, a shift from the reference value of the driving range, and a shift from the initial position (reference position) and corrects the offset information, thereby performing correction of the driving characteristics of each of the left and right vibration detection/correction systems and balance adjustment between the left and right systems.

Processing on the microcomputer 20 in characteristic measurement and calibration of the second embodiment will be described below with reference to the flow chart of FIG. 15. In this case, assume that a switch for turning on the power and a switch for designating the calibration mode are provided.

The VAP control/driving system has the same circuit arrangement as in the first embodiment shown in FIGS. 1 and 2, and processing is executed by the microcomputer 20.

When processing is started, and the power is turned on in step S300, the flow advances to step S301. An observer detection unit 10 determines whether observation by the observer is performed, i.e., whether the observer is looking through the finder.

If YES in step S301, the flow advances to step S302 to perform a normal vibration correction operation, and the flow returns to step S301.

If NO in step S301, the flow advances to step S303 to detect the state of the calibration switch 9. If the calibration switch 9 is ON, the flow advances to step S304; otherwise, the flow advances to step S305.

In step S304, it is determined on the basis of the state of the calibration end flag whether the calibration operation is completed. If YES in step S304, the flow advances to step S305 to stop the correction operation of the VAP driving-system (mechanically fix the VAP), and the flow returns to step S301. With this processing, no waste correction operation (VAP driving) is performed so that a power saving effect can be obtained.

If, in step S304, the calibration end flag is not set, and the calibration operation is not completed yet, the flow advances to step S306.

In step S306, a VAP center reference holding signal is output from the calibration block 207 of the microcomputer 20. As in the calibration operation described in the first embodiment with reference to FIG. 4, optical polarization offset correction of the left-side VAP driving system is performed in step S307. With this processing, optical axis correction of the left-side VAP is performed.

In step S308, as on the left side, optical polarization offset correction on the right side is performed. With this processing, optical axis correction of the right-side VAP is performed, thereby completing optical axis offset correction of the left and right VAPs.

In step S309, a VAP driving waveform (pseudo driving waveform) is output from the calibration block 207 in the microcomputer 20 to confirm the VAP movable range. This processing is performed to confirm the VAP movable range, and a signal having an amplitude larger than the maximum value of the normal VAP movable range is output.

In step S310, an angular displacement signal from an angular displacement encoder 4e for detecting the angular displacement of the VAP is A/D-converted and fetched by the calibration block 207.

In step S311, the driving waveform is compared with the response waveform, and the movable range of each of the left and right VAP driving systems is measured.

In step S312, the VAP driving range is set on the basis of the result obtained in step S311, and correction is performed to equalize the driving ranges of the left and right VAPs with each other. Note that the offset correction amounts of the left and right VAP driving systems are stored in the EEPROM 6 and used as the next default values.

In this case, to set the VAP driving range, correction of characteristics as shown in FIG. 10 must be performed within a range for maintaining identical fields on the left and right sides. More specifically, the left and right VAPs are constituted to be operated with the same characteristics (within the driving limit, i.e., within the range for obtaining the same response characteristics at the reference position serving as an optical axis center in the initial state).

Setting (correction) of the VAP driving range is realized by supplying offset information to the phase/gain correction units 204 and 204' through a control data line C in FIG. 1, limiting the dynamic range by providing a limiter to the D/A converter in the phase/gain correction units 204 and 204', and limiting the amplitude of a vibration correction control signal.

The driving limit is set in a range much smaller than the smaller one of the left and right VAPs. With this processing, the left and right VAPs can be stably driven in a good balance while leaving a margin in the movable range.

The calibration operation is ended. In step S313, the calibration end flag is set, and the flow returns to step S301.

In an actual application, the left and right driving ranges can be independently set in the YAW and PITCH directions (one of them is fixed near the center)

As described above, according to the second embodiment, optimum vibration correction (adaptive control) can be performed in correspondence with a mechanical degradation such as shaft friction or element deformation caused by the temperature and time change. Particularly, in an optical system such as a binocular having a plurality of vibration correction optical systems, balance adjustment not only between the individual vibration correction systems but also between the left and right correction systems can be simultaneously performed.

Third Embodiment

The third embodiment of the present invention will be described below.

In a vibration correction apparatus using a VAP unit controlled by a servo mechanism, polarization of a light beam has an offset with respect to an expected optical axis (initial state) when a reference position holding signal is applied because of a mechanical degradation such as shaft friction or element deformation caused by the temperature, a time change, and a posture difference.

The shift in optical axis sometimes causes a discomfort to the observer when two optical systems are used for a binocular, though the offset is negligible in a single optical system.

In the third embodiment, therefore, correction can be performed not only in a calibration operation, as a matter of course, but also particularly in a vibration correction operation when each of the left and right signals obviously has an offset, such that the left and right signals coincide with each other.

More specifically, in an IS operation (vibration correction), when an output from the angle sensor of each of the left and right VAPs changes while maintaining a predetermined displacement with respect to the vibration control signal within the low-frequency band where satisfactory follow-up properties are ensured, the offset is gradually changed to perform correction.

In the third embodiment as well, the VAP control system has the same arrangement as in the first embodiment shown in FIGS. 1 and 2, and a detailed description thereof will be omitted.

Processing executed by the microcomputer 20 in the third embodiment will be described below with reference to the flow chart of FIG. 16.

Figure 16:
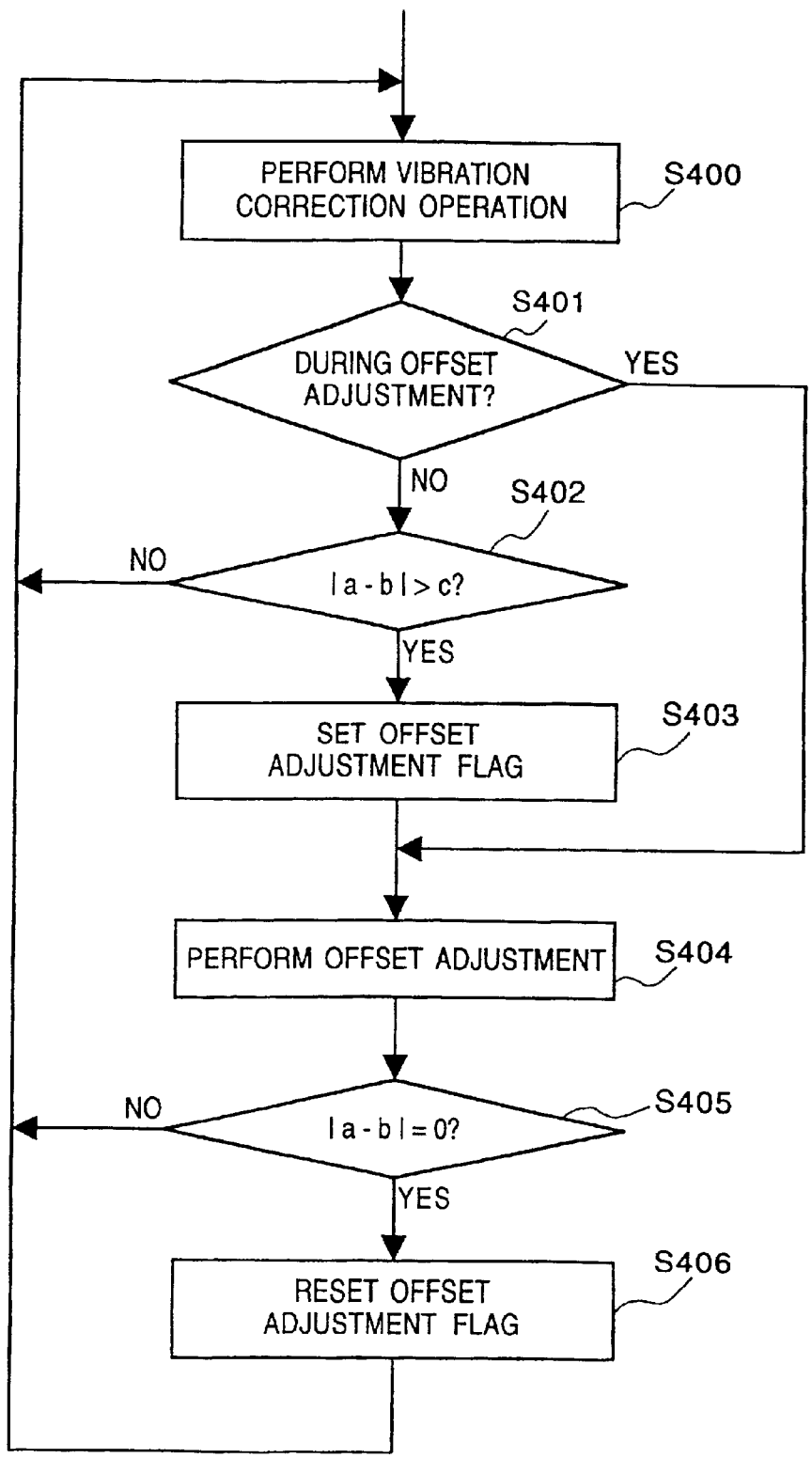
FIG. 16 is a flow chart showing the third embodiment of the present invention.

Processing in the flow chart of FIG. 16 can be executed during a normal vibration correction operation, and step S400 represents that the vibration correction operation is being performed.

In step S401, it is determined on the basis of the state of the offset adjustment flag whether offset adjustment is being performed. If YES in step S401, the flow advances to step S404 to perform the adjustment operation. If NO in step S401, the flow advances to step S402.

In step S402, a difference between a VAP driving signal a for performing vibration correction, which is supplied from a microcomputer 20 to a driving unit 4 in a vibration correction block 30, and an angular displacement signal b output from an angular displacement encoder 4e, i.e., |a−b| is calculated and compared with the initial state. If the displacement difference is larger than a predetermined average set value c, the flow advances to step S403; otherwise, the flow returns to step S400.

In step S403, the offset adjustment flag is set, and offset adjustment is performed in step S404 to decrease the difference |a−b|. More specifically, the offset output is changed by a predetermined value such that the displacement difference decreases (as will be described later, to correct the offset output, a technique using a dedicated adjustment mechanism or a technique for adding an offset to the VAP driving signal output from the microcomputer 20 is used).

In step S405, it is checked whether the displacement difference between the VAP driving signal and the angle sensor signal is "0". If YES in step S405, the flow advances to step S406; otherwise, the flow returns to step S400.

In step S406, the offset adjustment flag is reset to end offset adjustment, and the flow returns to step S400.

In the vibration correction apparatus using the VAP unit controlled by a servo mechanism, polarization of a light beam has an offset with respect to an expected optical axis when a reference position holding signal is applied because of a mechanical degradation such as shaft friction or element deformation caused by the temperature, a time change, and a posture difference.

The shift in optical axis sometimes causes a discomfort to the observer when two optical systems are used for a binocular, though the offset is negligible in a single optical system.

In the third embodiment, therefore, correction is performed not only in a calibration operation, as a matter of course, but also particularly in a vibration correction operation when each of the left and right signals obviously has an offset, such that the left and right signals coincide with each other. With this arrangement, satisfactory observation can be performed while the left and right optical axes coincide with each other. Particularly, since this offset adjustment can be performed in the normal vibration correction operation, the operability is largely improved without causing the observer to feel the calibration operation. In addition, proper observation can always be performed without causing a sense of incompatibility in an image.

Fourth Embodiment

The fourth embodiment of the present invention will be described below. In a binocular incorporating two sets of VAP units as shown in FIG. 14, VAP units 302L and 302R are mechanically arranged in a symmetrical layout.

That is, the left and right inertial forces are different because of its structure. Additionally, in the above VAP unit, an output from the angular displacement detector with respect to the optical axis center position of the VAP shifts because of the attachment error of the angular displacement detection element. Therefore, offset adjustment must be performed.

To adjust an offset with respect to an output from the angular displacement detector, initial adjustment is performed such that a light beam passing through the VAP coincides with the optical axis while a VAP center reference position holding signal is output from the microcomputer. This processing can be realized by adding an offset to the VAP center reference position holding signal. However, the adjustment range must be set large in accordance with the magnification of variations in offset caused by elements or mechanical structure, and this results in a decrease in dynamic range. A D/A converter with a high resolution may be used, though this device is expensive.

As shown in FIG. 2, therefore, an inexpensive D/A converter 4f with a low resolution externally arranged or incorporated in a one-chip microcomputer is combined with offset addition to the VAP driving signal.

More specifically, coarse adjustment is performed by the inexpensive D/A converter with a low resolution, and fine adjustment is performed by using an offset of the vibration control signal.

When these two adjustment means are controlled by the microcomputer 20, adjustment can be naturally performed. With this arrangement, highly precise offset adjustment can be performed in a wide range.

To measure the optical polarization position signal of the VAP, a technique for receiving a light beam such as a laser beam passing through the VAP by using a PSD, or the like, can be employed.

Figure 17:
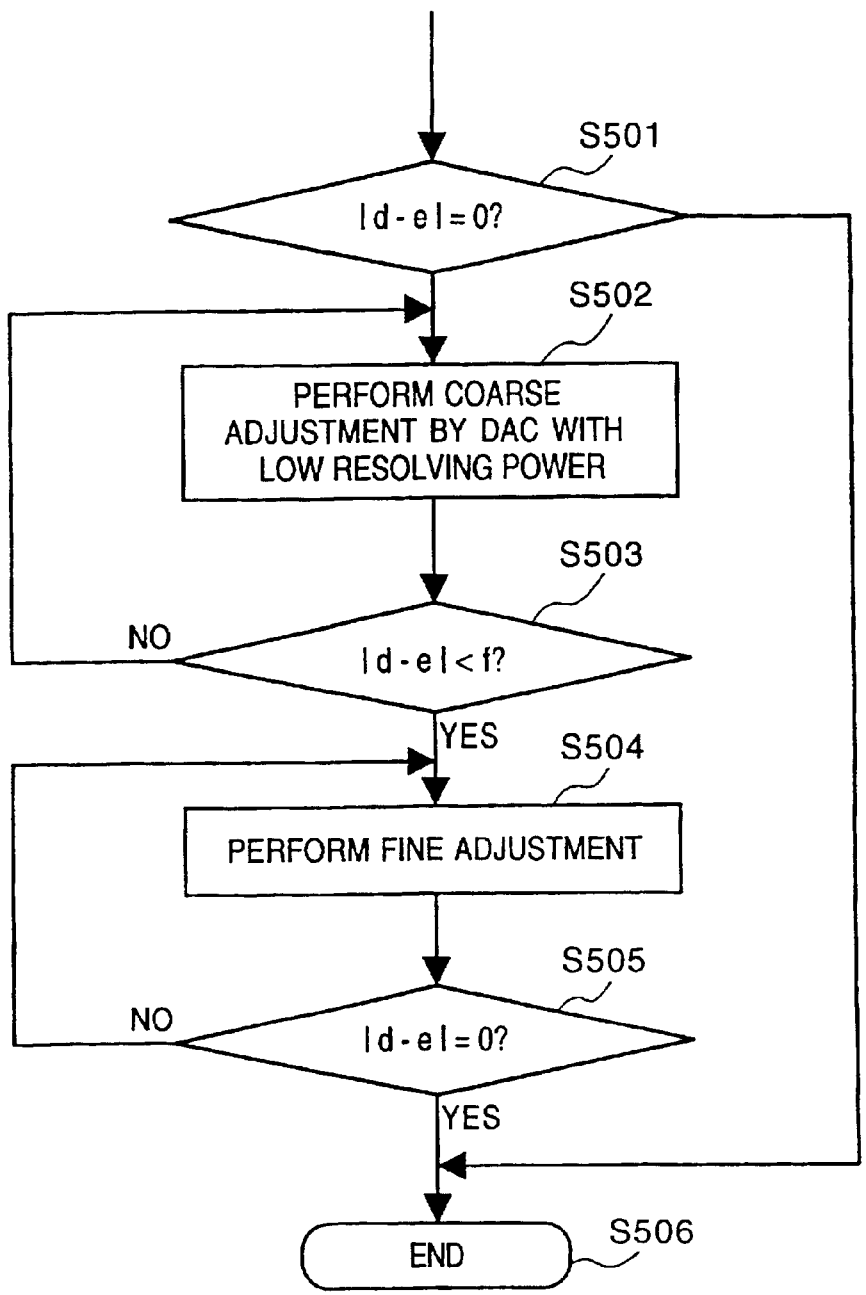
FIG. 17 is a flow chart showing the fourth embodiment of the present invention.

Processing on the microcomputer 20 in this embodiment will be described below with reference to the flow chart of FIG. 17.

When processing is started, a measured VAP optical center position signal d is compared with a VAP optical polarization position signal e (a polarization displacement signal from the center position of a light beam which is perpendicularly incident) in step S501. If the difference between the two signals is "0", the flow advances to step S502; otherwise, the flow advances to step S506.

In step S502, coarse adjustment is performed by the inexpensive D/A converter with a low resolution. More specifically, a predetermined bias is applied to the value of an angular displacement encoder 4e by the D/A converter 4f in FIG. 2, thereby coarsely adjusting the VAP reference position.

In step S503, if the difference between the VAP optical center position signal d and the VAP optical polarization position signal e is smaller than a predetermined value f, the flow advances to step S404. The value f is set as the adjustment limit value of the D/A converter 4f with a low resolution.

In step S504, fine adjustment is performed by adding an offset to the VAP control signal supplied from the microcomputer 20 to the driving unit 4. This fine adjustment is highly precisely performed by finely adjusting the level of the vibration correction control signal supplied from a phase/gain correction unit 204 to a vibration correction block 30.

In step S505, the VAP optical center position signal d is compared with the VAP optical polarization position signal e (a polarization displacement signal from the center position of a light beam which is perpendicularly incident). If the difference |d−e| between the two signals is "0", the flow advances to step S506 to end the offset adjustment operation; otherwise, the flow returns to step S504. Step S506 represents the end of the adjustment operation.

Although adjustment for only one axis has been described above, adjustment for four axes on the left and right sides in the YAW and PITCH directions is required in the binocular shown in FIG. 14.

In the vibration correction apparatus using the VAP unit controlled by a servo mechanism, polarization of a light beam has an offset with respect to an expected optical axis when a reference position holding signal is applied because of a mechanical degradation such as shaft friction or element deformation caused by the temperature, a time change, and a posture difference. The shift in optical axis sometimes causes a discomfort to the observer when two optical systems are used for a binocular, though the offset is negligible in a single optical system.

In the fourth embodiment, therefore, correction is performed stepwise in a calibration operation or in a vibration correction operation when each of the left and right signals obviously has an offset, such that the left and right signals coincide with each other. With this arrangement, satisfactory observation can be performed while the left and right optical axes coincide with each other.

In the above embodiments, the vibration detection means for detecting a vibration can be embodied by the angular velocity detection unit 1. Similarly, in the embodiment, the movement correction means for correcting the movement of an image due to the vibration on the basis of an output from the vibration detection means mainly can be embodied by the integration unit 203 and a phase/gain correction unit 204 in a microcomputer 20 and a driving unit 4 and an image correction unit 5 in a vibration correction block 30. In the embodiment, the control means for detecting the response characteristics of the movement correction means with respect to the predetermined driving signal and correcting the driving characteristics of the movement correction means on the basis of the detection result can be embodied by the calibration block 207 in the microcomputer 20.

There is also provided the vibration correction apparatus, wherein the control means detects a response amplitude and a phase shift of the movement correction means with respect to the driving signal and changes a transfer frequency characteristic of a control system consisting of the vibration detection means and the movement correction means in accordance with the response amplitude and the phase shift.

With the above arrangement, the response characteristics of the movement correction means with respect to the test driving signal are detected, and a shift in actual response characteristics with respect to an ideal frequency characteristic is corrected, so that the change in characteristics caused by a mechanical error such as shaft friction or element deformation caused by the temperature and time change can be corrected.

In this arrangement, processing of the control means can be embodied by the processing of changing the frequency characteristic of the phase/gain correction unit 204.

There is also provided the vibration correction apparatus, wherein said control means detects the response amplitude and the phase shift of said movement correction means with respect to the driving signal and corrects a transfer gain and a phase of said control system consisting of said vibration detection means and said movement correction means.

With the above arrangement, the response amplitude and the phase shift of the movement correction means with respect to the test driving signal are detected, and the transfer gain and the phase shift of the control system consisting of the movement detection means and the movement correction means are corrected. Therefore, the change in frequency characteristic caused by a mechanical error such as shaft friction or element deformation caused by the temperature and time change can be corrected so that the optimum characteristics can be obtained regardless of the difference between individual devices.

In this arrangement, processing of the control means can be embodied by processing of changing the frequency characteristic of the gain and phase of the phase/gain correction unit 204.

There is also provided the vibration correction apparatus, wherein the control means detects a driving range of the movement correction means with respect to the driving signal, calculates an offset with respect to a predetermined driving range reference value, and corrects a driving limit of the movement correction means in accordance with the offset.

With the above arrangement, the offset of the movement correction means with respect to the driving range reference value is detected so that the driving limit of the movement correction means is corrected to the optimum value.

In this arrangement, processing of the control means can be embodied by processing of arranging a limiter to the D/A converter in the phase/gain correction unit 204 to prevent the VAP from falling outside a predetermined range in an embodiment.

There is also provided the vibration correction apparatus, wherein the driving signal is a signal for positioning the movement correction means at a reference position, and the control means detects an offset of the movement correction means with respect to the reference position and corrects an initial position of the movement correction means in accordance with the offset.

With the above arrangement, the offset of the movement correction means with respect to the reference position is detected, the initial position of the movement correction means is corrected, and the offset in movement correction is corrected, so that the dynamic range in correction can be set wide.

In this arrangement, the driving signal is a signal for positioning the movement correction means at the reference position. Processing of the control means can be embodied by processing for biasing an output from an angular displacement encoder 4e by a D/A converter 4f in the driving unit 4.

There is also provided the vibration correction apparatus, wherein said movement correction means is optical vibration correction means including a variable angle prism.

With the above arrangement, degradation and change in driving characteristics due to a mechanical error such as element deformation caused by the temperature and time change of the VAP are satisfactorily corrected so that optimum control can be performed.

There are also provided the vibration correction apparatus, further comprising switching means for switching between an operative state and an inoperative state of the movement correction means, and wherein the control means corrects the driving characteristics of the movement correction means in accordance with a switching operation of the switching means and the vibration correction apparatus, further comprising power supply detection means for detecting and displaying a remaining amount of a power supply incorporated in the apparatus, and wherein the control means corrects the driving characteristics of the movement correction means in accordance with an operation of the power supply detection means.

With the above arrangement, the detection/correction operation of the driving characteristics of the movement correction means can be performed while the photographing operation is not performed, i.e., when the operative and inoperative states of the movement correction means is switched, or the battery is checked, at a good timing. Therefore, correction of the driving characteristics can be performed without impeding the photographing operation.

In this arrangement, the switching means can be embodied by the IS switch 7. The power supply detection means can be embodied by the battery check switch 8.

There is also provided the vibration correction apparatus, further comprising detection means for detecting that an operator observes an eyepiece unit of the vibration correction apparatus, and wherein the control means inhibits correction of the driving characteristics of the movement correction means when the detection means detects that the operator is observing through the eyepiece unit.

With the above arrangement, when the operator is observing an image through the eyepiece unit of the vibration correction apparatus, the detection/correction operation of the driving characteristics of the movement correction means is inhibited. Therefore, the photographing operation can always be satisfactorily performed without impeding the photographing operation.

In this arrangement, the detection means can be embodied by the observer detection unit 10.

In the above embodiments, the vibration detection means for detecting the vibration of the image pickup device main body can be embodied by the angular velocity detection unit 1. The movement correction means for correcting the movement of the image due to the vibration on the basis of the output from the vibration detection means can be embodied by the integration unit 203 and the phase/gain correction unit 204 in the microcomputer 20 and the driving unit 4 and the image correction unit 5 in the vibration correction block 30. The characteristic detection means for detecting the response characteristics of the movement correction means with respect to the predetermined driving signal and calculating the offset between the detection result and the predetermined reference value can be embodied by the calibration block 207 in the microcomputer 20. In the embodiment, the storage means for storing the offset calculated by the characteristic detection means corresponds to an EEPROM 6. In the embodiment, the control means for correcting the driving characteristics of the movement correction means on the basis of the offset information stored in the storage means can be embodied by the microcomputer 20 and the calibration block 207.

There is also provided the vibration correction apparatus, wherein the characteristic detection means detects an offset in response amplitude and phase of the movement correction means with respect to the driving signal, and the control means changes a transfer frequency characteristic of a control system consisting of the vibration detection means and the movement correction means.

With the above arrangement, an offset in actual response characteristics with respect to an ideal frequency characteristic can be detected.

In this arrangement, processing of the control means can embodied by processing of changing the frequency characteristic of the phase/gain correction unit 204.

There is also provided the vibration correction apparatus, wherein the characteristic detection means detects the offset in response amplitude and phase of the movement correction means with respect to the driving signal, and the control means corrects a transfer gain and a phase of a control system consisting of the vibration detection means and the movement correction means.

With the above arrangement, the response amplitude and the phase shift of the movement correction means with respect to the test driving signal are detected. In accordance with the response amplitude and the phase shift, the transfer gain and the phase shift of the control system consisting of the movement detection means and the movement correction means are corrected.

In this arrangement, processing of the control means can be embodied by processing of changing the frequency characteristic of the phase/gain correction unit 204.

There is also provided the vibration correction apparatus, wherein the characteristic detection means detects a driving range of the movement correction means with respect to the driving signal and calculates the offset with respect to a predetermined driving range reference value, and the control means corrects the driving characteristics of the movement correction means in accordance with the offset.

With the above arrangement, the offset of the movement correction means with respect to the driving range is detected so that the driving limit of the movement correction means is corrected to the optimum value.

In this arrangement, processing of the control means can be embodied by processing of arranging a limiter to the D/A converter in the phase/gain correction unit 204 to prevent the VAP from falling outside a predetermined range in an embodiment to be described later.

There is also provided the vibration correction apparatus, wherein the driving signal is a signal for positioning the movement correction means at a reference position, the characteristic detection means detects the offset of the movement correction means with respect to the reference position, and the control means corrects the driving characteristics of the movement correction means in accordance with the offset.

With the above arrangement, the offset of the movement correction means with respect to the reference position is detected, the initial position of the movement correction means is corrected, and the offset in movement correction is corrected, so that the dynamic range in correction can be set wide.

In this arrangement, processing of the control means can be embodied by processing of biasing an output from the angular displacement encoder 4e by the D/A converter 4f in the driving unit 4.

In this arrangement, the first movement correction means for correcting the movement of the image due to a vibration can be embodied by the right-side VAP, vibration correction blocks 30R and 30R', integration means 203R and 203R' and phase/gain correction means 204R and 204R' in a microcomputer 20, and a driving system thereof arranged in the right-side optical system of the binocular. In the embodiment, the second movement correction means for correcting the movement of the image due to the vibration can be embodied by the left-side VAP, vibration correction blocks 30L and 30L', integration means 203L and 203L' and phase/gain correction means 204L and 204L' in the microcomputer 20, and a driving system thereof arranged in the left-side optical system of the binocular. In the embodiment, the control means can be embodied by a calibration block 207 in the microcomputer 20.

There are also provided the vibration correction apparatus, wherein the control means detects response amplitudes and phase shifts of the first and second movement correction means with respect to the driving signal and performs correction in accordance with the response amplitudes and the phase shifts such that transfer frequency characteristic of the first movement correction means are substantially equalized with those of the second movement correction means and the vibration correction apparatus, wherein the control means detects response amplitudes and phase shifts of the first and second movement correction means with respect to the driving signal and corrects gains and phases of the first and second movement correction means in accordance with the response amplitudes and the phase shifts.

With the above arrangement, the response amplitudes and the phase shifts of the first and second movement correction means with respect to the driving signal are detected. In accordance with the response amplitudes and the phase shifts, the gains and the phase shifts of the movement correction means are corrected in a good balance.

Figure 4:
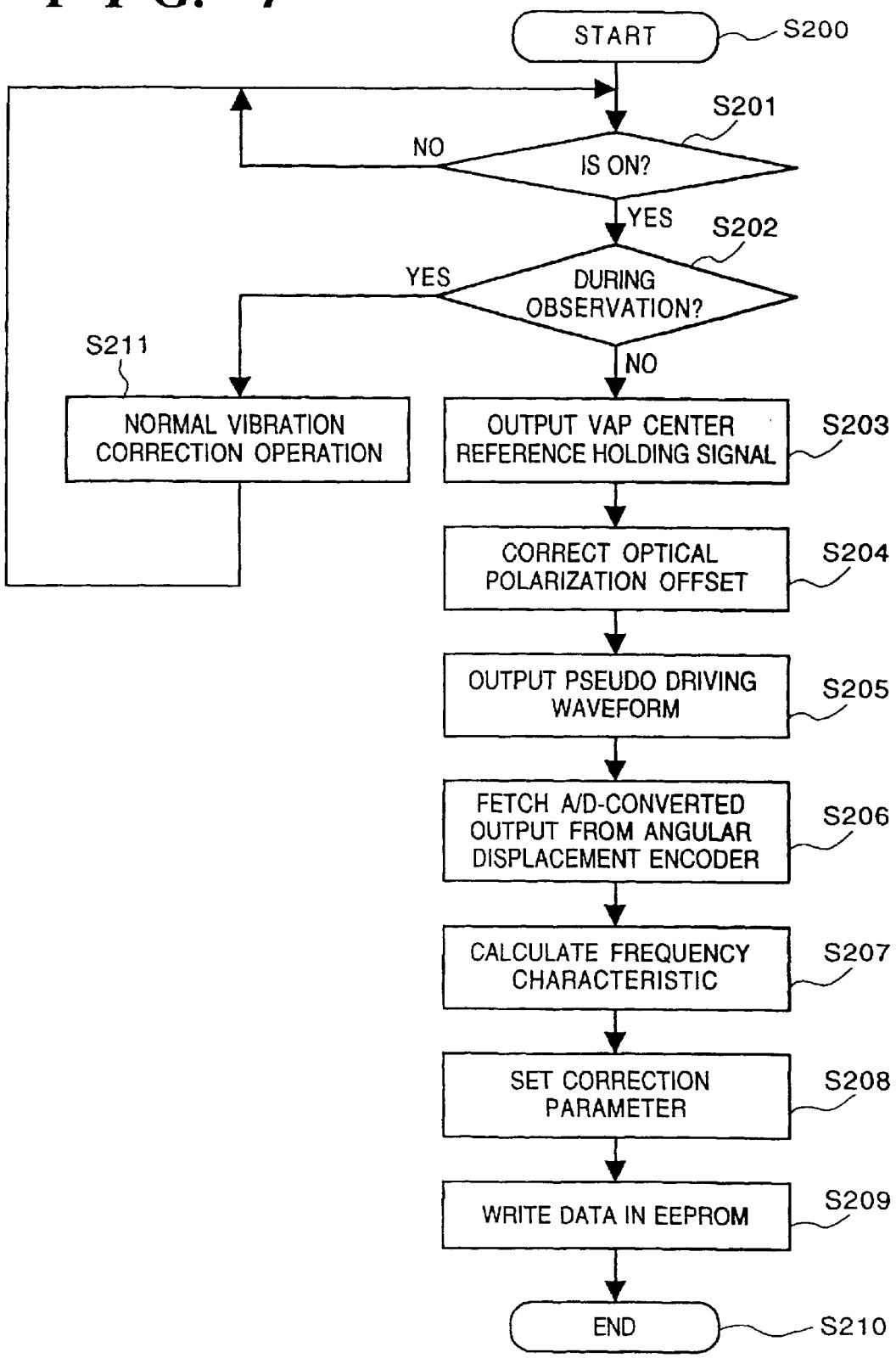
FIG. 4 is a flow chart for explaining the operation of the first embodiment.

In this arrangement, processing of the control means can be embodied by processing for the left and right vibration correction systems, which is performed by the microcomputer 20 in steps S5 to S9 of FIG. 4.

There is also provided the vibration correction apparatus, wherein the control means detects driving ranges of the first and second movement correction means with respect to the driving signal, calculates offsets with respect to a predetermined driving range reference value, and corrects driving limits of the first and second movement correction means in accordance with the offsets.

With the above arrangement, the offsets of the first and second movement correction means with respect to the driving range reference value are detected, so that the driving limits of the movement correction means are corrected to the optimum values in a good balance.

Figure 15:
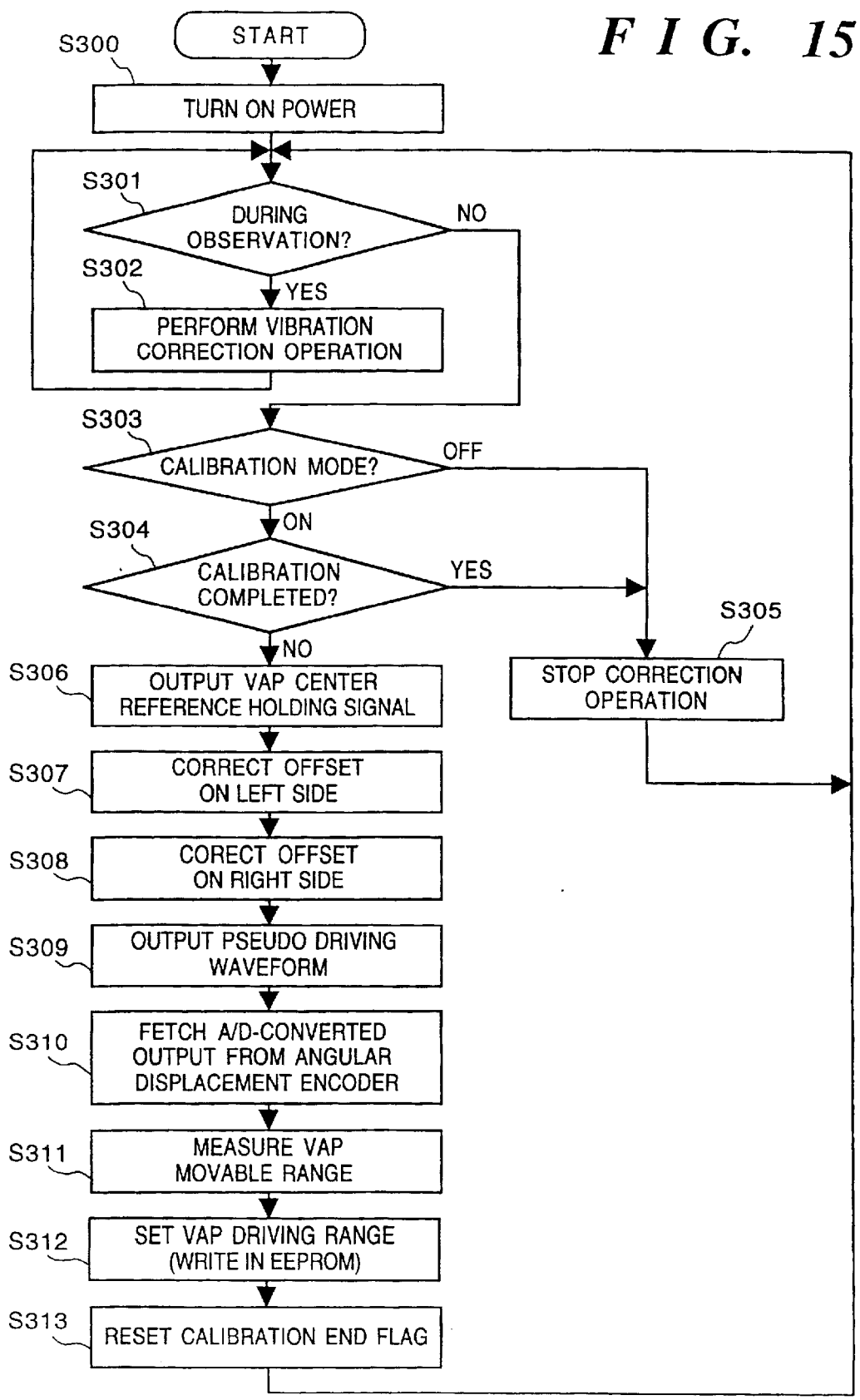
FIG. 15 is a flow chart showing the second embodiment of the present invention.

In this arrangement, processing of the control means can be embodied by processing in steps S209 to S212 in the flow chart of FIG. 15, which is performed by the microcomputer 20.

There is also provided the vibration correction apparatus, wherein the driving signal is a signal for positioning the first and second movement correction means at a reference position, and the control means detects offsets of the first and second movement correction means with respect to the reference position and corrects initial positions of the first and second movement correction means in accordance with the offsets.

With the above arrangement, the offsets of the first and second movement correction means with respect to the reference position are detected, the initial positions of the movement correction means are corrected, and the offset in movement correction is corrected, so that the dynamic range in movement correction can be set wide while balancing the first and second movement correction means.

In this arrangement, processing of the control means can be embodied by processing in steps S202 to S208 in the flow chart of FIG. 15, which is performed by the microcomputer 20.

There is also provided the vibration correction apparatus, wherein the movement correction means is optical vibration correction means including a variable angle prism.

With the above arrangement, degradation and change in driving characteristics due to a mechanical error such as element deformation caused by the temperature and time change of the VAP are satisfactorily corrected so that optimum control can be performed.

There is also provided the vibration correction apparatus, wherein the control means has calibration means consisting of driving signal generation means for generating the driving signal and characteristic detection means for detecting response characteristics of the first and second movement correction means with respect to the driving signal.

With the above arrangement, the response characteristics of the first and second movement correction means are arbitrarily detected by a calibration operation, and the offsets are corrected. At the same time, the balance between the first and second movement correction means can always be held in the optimum state. Therefore, even when the use conditions change due to the time change or a change in environment, the apparatus can always be used in the optimum state.

In the above embodiments, the first optical system having the movable portion for changing the optical characteristics can be embodied by the right-side VAP arranged in the right-side optical system of the binocular. In the embodiment, the first driving means for driving the first optical system can be embodied by the vibration correction blocks 30R and 30R', and the integration means 203R and 203R' and the phase/gain correction means 204R and 204R' in the microcomputer 20. In the embodiment, the second optical system having the movable portion for changing the optical characteristic can be embodied by the left-side VAP arranged in the left-side optical system of the binocular. In the embodiment, the second driving means for driving the second optical system can be embodied by the vibration correction blocks 30L and 30L', and the integration means 203L and 203L' and the phase/gain correction means 204L and 204L' in the microcomputer 20. In the embodiment, the control means can be embodied by the calibration block 207 in the microcomputer 20.

There is also provided the optical device, wherein said control means detects offsets with respect to frequency characteristics, driving ranges, and initial positions of said first and second driving means and corrects the offsets by changing the driving characteristics of at least one of said first and second driving means.

With the above arrangement, the response amplitudes and the phase shifts of the first and second optical systems and the first and second driving means with respect to the driving signal, the offsets with respect to the driving range reference value, and the driving limits of the movement correction means are corrected to the optimum values in a good balance.

In this arrangement, processing of the control means can be embodied by processing of the left and right vibration correction systems, which is performed in steps S5 to S9 of FIG. 4 by the microcomputer 20, and processing in steps S202 to S212 in the flow chart of FIG. 15.

Other Embodiment

The present invention can be applied to a system constituted by a plurality of devices (e.g., host computer, interface, camera, recorder) or to an apparatus comprising a single device (e.g., videocamcoder).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory, provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit, said method comprising:
    providing a predetermined driving signal to the movement correction unit;
    driving the movement correction unit on the basis of the provided predetermined driving signal;
    detecting response amplitude and phase shift of the movement correction unit with respect to said predetermined driving signal;
    obtaining correction information for changing a transfer frequency characteristic of a control system including the vibration detection device and the movement correction unit in accordance with the detected response amplitude and phase shift; and
    storing the obtained correction information.

2. The method according to claim 1, wherein the movement correction unit is an optical correction unit including a variable angle prism.

3. The method according to claim 1, wherein upon obtaining the correction information, correction information corresponding to the detected response amplitude and phase shift is selected and fetched from a memory storing plural pieces of predetermined correction information.

4. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
    providing a predetermined driving signal to the movement correction unit;
    driving the movement correction unit on the basis of the provided predetermined driving signal;
    detecting a driving range of the movement correction unit by comparing a driving result signal obtained with respect to said predetermined driving signal;
    calculating an offset of the detected driving range of the movement correction unit with respect to a predetermined driving range reference value;
    obtaining correction information for correcting a driving limit of the movement correction unit in accordance with the calculated offset; and
    storing the obtained correction information.

5. The method according to claim 4, wherein the movement correction unit is an optical correction unit including a variable angle prism.

6. The method according to claim 4, wherein upon obtaining the correction information, correction information corresponding to the calculated offset is selected and fetched from a memory storing plural pieces of predetermined correction information.

7. A detection method for detecting driving characteristics of a vibration correction apparatus, correcting, and driving the vibration correction apparatus, wherein the vibration correction apparatus has a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
providing a predetermined driving signal to the movement correction unit;
driving the movement correction unit on the basis of the provided predetermined driving signal;
detecting response amplitude and phase shift of the movement correction unit with respect to said predetermined driving signal;
obtaining correction information for changing a transfer frequency characteristic of a control system including the vibration detection device and the movement correction unit in accordance with the detected response amplitude and phase shift; and
driving the movement correction unit using the correction information.

8. The method according to claim 7, wherein the movement correction unit is an optical correction unit including a variable angle prism.

9. The method according to claim 7, wherein upon obtaining the correction information, correction information corresponding to the detected response amplitude and phase shift is selected and fetched from a memory storing plural pieces of predetermined correction information.

10. A detection method for detecting driving characteristics of a vibration correction apparatus, correcting, and driving the vibration correction apparatus, wherein the vibration correction apparatus has a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
providing a predetermined driving signal to the movement correction unit;
driving the movement correction unit on the basis of the provided predetermined driving signal;
detecting a driving range of the movement correction unit with respect to said predetermined driving signal;
calculating an offset of the detected driving range of the movement correction unit with respect to a predetermine driving range reference value;
obtaining correction information for correcting a driving limit of the movement correction unit in accordance with the calculated offset;
storing the obtained correction information; and
driving the movement correction unit using the stored correction information.

11. The method according to claim 10, wherein the movement correction unit is an optical correction unit including a variable angle prism.

12. The method according to claim 10, wherein upon obtaining the correction information, correction information corresponding to the calculated offset is selected and fetched from a memory storing plural pieces of predetermined correction information.

13. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
outputting a driving signal corresponding to a predetermined vibration;
driving the movement correction unit on the basis of the outputted driving signal;
detecting response amplitude and phase shift of the movement correction unit with respect to the outputted driving signal;
obtaining correction information for changing a transfer frequency characteristic of a control system including the vibration detection device and the movement correction unit in accordance with the detected response amplitude and phase shift; and
storing the obtained correction information.

14. The method according to claim 13, wherein the movement correction unit is an optical correction unit including a variable angle prism.

15. The method according to claim 13, wherein upon obtaining the correction information, correction information corresponding to the detected response amplitude and phase shift is selected and fetched from a memory storing plural pieces of predetermined correction information.

16. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
outputting a driving signal corresponding to a predetermined vibration;
driving the movement correction unit on the basis of the outputted driving signal;
detecting a driving range of the movement correction unit with respect to the outputted reference driving signal;
calculating an offset of the detected driving range of the movement correction unit with respect to a predetermined driving range reference value;
obtaining correction information for correcting a driving limit of the movement correction unit in accordance with the calculated offset; and
storing the obtained correction information.

17. The method according to claim 16, wherein the movement correction unit is an optical correction unit including a variable angle prism.

18. The method according to claim 16, wherein upon obtaining the correction information, correction information corresponding to the detected calculated offset is selected and fetched from a memory storing plural pieces of predetermined correction information.

19. A detection method for detecting driving characteristics of a vibration correction apparatus, correcting, and driving the vibration correction apparatus, wherein the vibration correction apparatus has a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
outputting a driving signal corresponding to a predetermined vibration;
driving the movement correction unit on the basis of the outputted driving signal;
detecting response amplitude and phase shift of the movement correction unit with respect to the outputted driving signal;
obtaining correction information for changing a transfer frequency characteristic of a control system including the vibration detection device and the movement correction unit in accordance with the detected response amplitude and phase shift;
storing the obtained correction information; and
driving the movement correction unit using the stored correction information.

20. The method according to claim 19, wherein the movement correction unit is an optical correction unit including a variable angle prism.

21. The method according to claim 19, wherein upon obtaining the correction information, correction information corresponding to the detected response amplitude and phase shift is selected and fetched from a memory storing plural pieces of predetermined correction information.

22. A detection method for detecting of a vibration correction apparatus, correcting, and driving the vibration correction apparatus, wherein the vibration correction apparatus has a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
outputting obtaining a driving signal corresponding to a predetermined vibration;
driving the movement correction unit on the basis of the outputted driving signal;
detecting a driving range of the movement correction unit with respect to the outputted reference driving signal;
calculating an offset of the detected driving range of the movement correction unit with respect to a predetermined driving range reference value;
obtaining correction information for correcting a driving limit of the movement correction unit in accordance with the calculated offset;
storing the obtained correction information; and
driving the movement correction unit using the stored correction information.

23. The method according to claim 22, wherein the movement correction unit is an optical correction unit including a variable angle prism.

24. The method according to claim 22, wherein upon obtaining the correction information, correction information corresponding to the detected calculated offset is selected and fetched from a memory storing plural pieces of predetermined correction.

25. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit, said method comprising:
providing a predetermined driving signal for moving the movement correction unit to a reference position to the movement correction unit;
driving the movement correction unit on the basis of the provided predetermined driving signal;
detecting an offset of the movement correction unit with respect to the reference position;
obtaining correction information for correcting an initial position of the movement correction unit in accordance with the detected offset; and
storing the obtained correction information.

26. The method according to claim 25, wherein the movement correction unit is an optical correction unit including a variable angle prism.

27. The method according to claim 25, wherein upon obtaining the correction information, correction information corresponding to the calculated offset is selected and fetched from a memory storing plural pieces of predetermined correction information.

28. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
obtaining a signal corresponding to a predetermined vibration;
driving the movement correction unit on the basis of the obtained signal;
detecting response amplitude and phase shift of the movement correction unit with respect to the obtained signal;
obtaining correction information for changing a transfer frequency characteristic of a control system including the vibration detection device and the movement correction unit in accordance with the detected response amplitude and phase shift; and
storing the obtained correction information.

29. A detection method for detecting driving characteristics of a vibration correction apparatus having a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
obtaining a signal corresponding to a predetermined vibration;
driving the movement correction unit on the basis of the obtained signal;
detecting a driving range of the movement correction unit with respect to the obtained signal;
calculating an offset of the detected driving range of the movement correction unit with respect to a predetermined driving range reference value;
obtaining correction information for correcting a driving limit of the movement correction unit in accordance with the calculated offset; and
storing the obtained correction information.

30. A detection method for detecting driving characteristics of a vibration correction apparatus, correcting, and driving the vibration correction apparatus, wherein the vibration correction apparatus has a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
obtaining a signal corresponding to a predetermined vibration;
driving the movement correction unit on the basis of the obtained signal;
detecting response amplitude and phase shift of the movement correction unit with respect to the obtained signal;
obtaining correction information for changing a transfer frequency characteristic of a control system including the vibration detection device and the movement correction unit in accordance with the detected response amplitude and phase shift;
storing the obtained correction information; and
driving the movement correction unit using the stored correction information.

31. A detection method for detecting of a vibration correction apparatus, correcting, and driving the vibration correction apparatus, wherein the vibration correction apparatus has a vibration detection device adapted to detect a vibration, a movement correction unit for correcting a movement of an image due to the vibration based on a vibration detection output detected by said vibration detection device, and a controller adapted to control an operation of said movement correction unit;

said method comprising:
obtaining a signal corresponding to a predetermined vibration;
driving the movement correction unit on the basis of the obtained signal;
detecting a driving range of the movement correction unit with respect to the obtained signal;
calculating an offset of the detected driving range of the movement correction unit with respect to a predetermined driving range reference value;
obtaining correction information for correcting a driving limit of the movement correction unit in accordance with the calculated offset;
storing the obtained correction information; and
driving the movement correction unit using the stored correction information.

* * * * *